Feb. 5, 1957 C. W. HATCHER 2,780,336
COIN CHANGING APPARATUS
Filed April 3, 1950 13 Sheets-Sheet 1
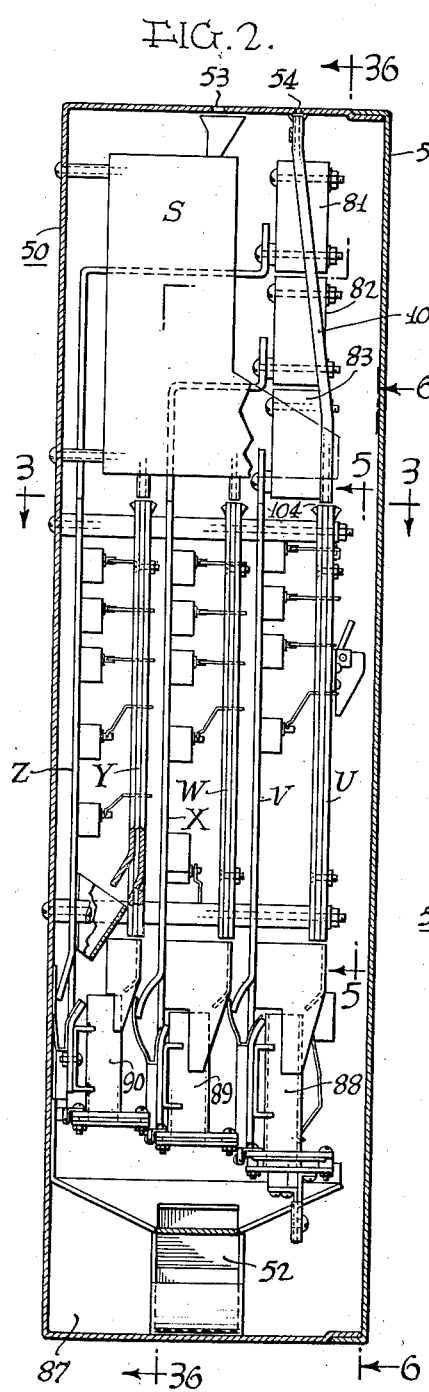
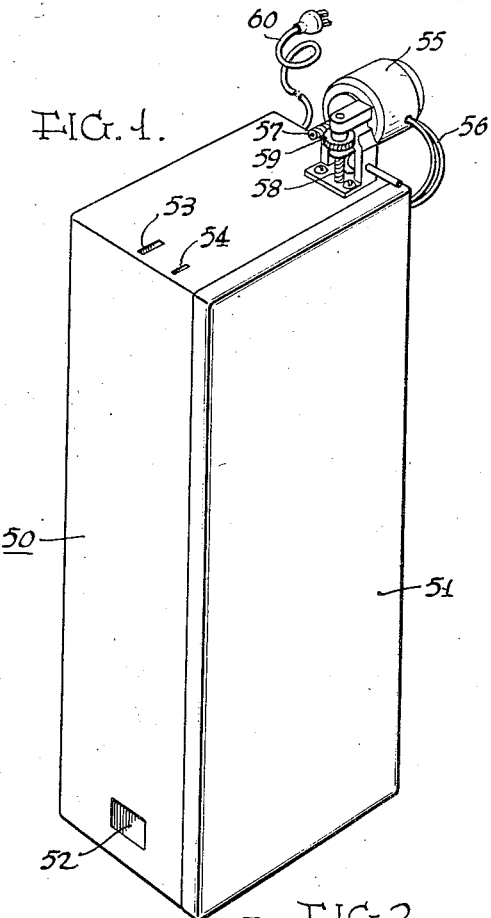
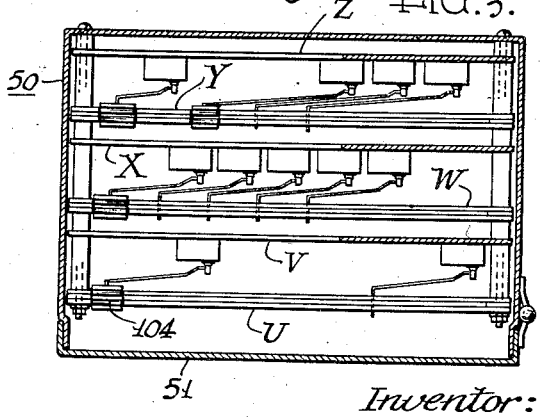
Inventor:
Creel W. Hatcher
by his Attorneys
Howson &
Howson

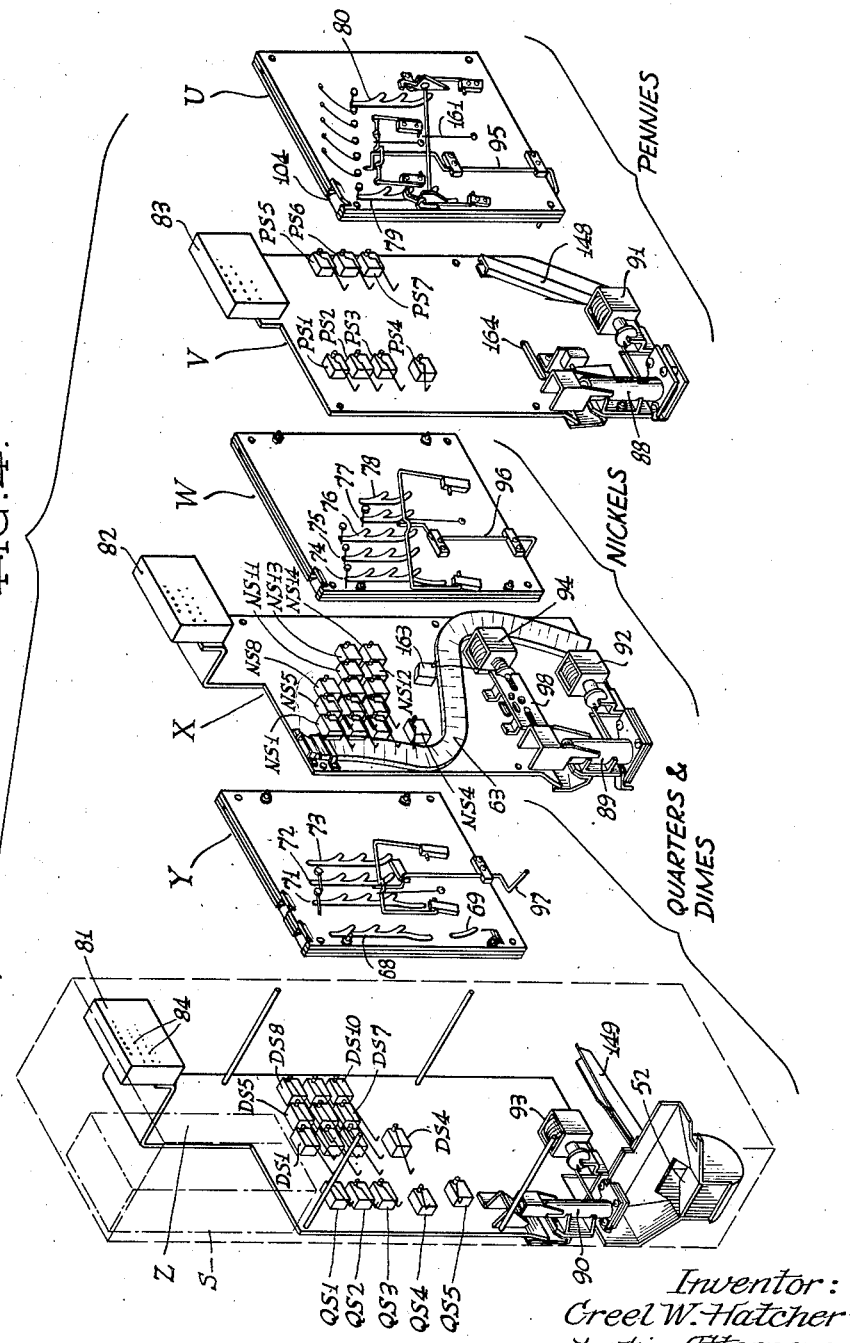

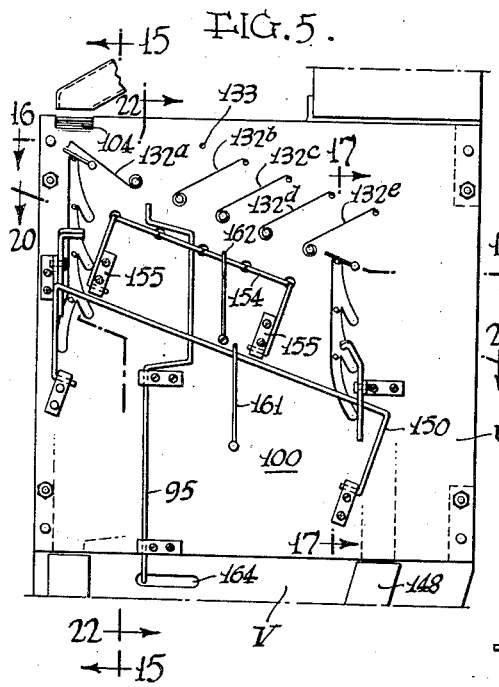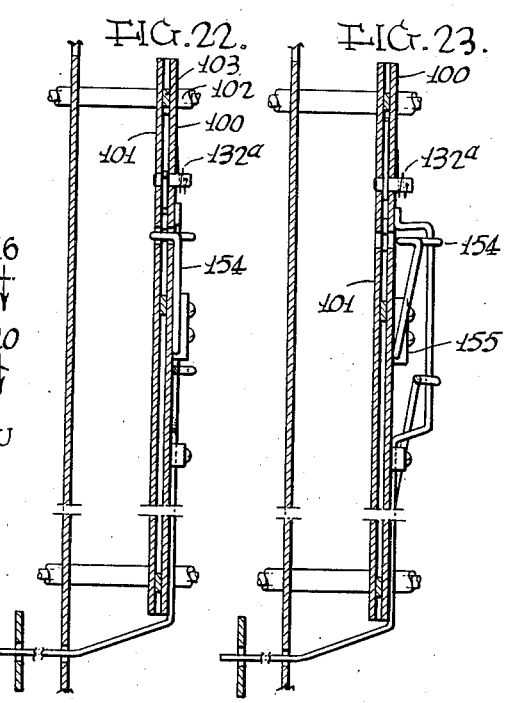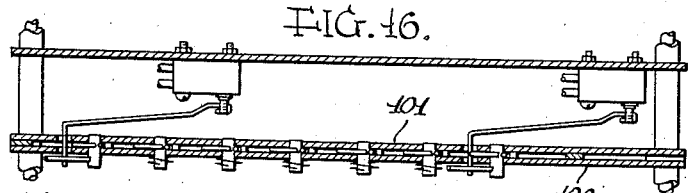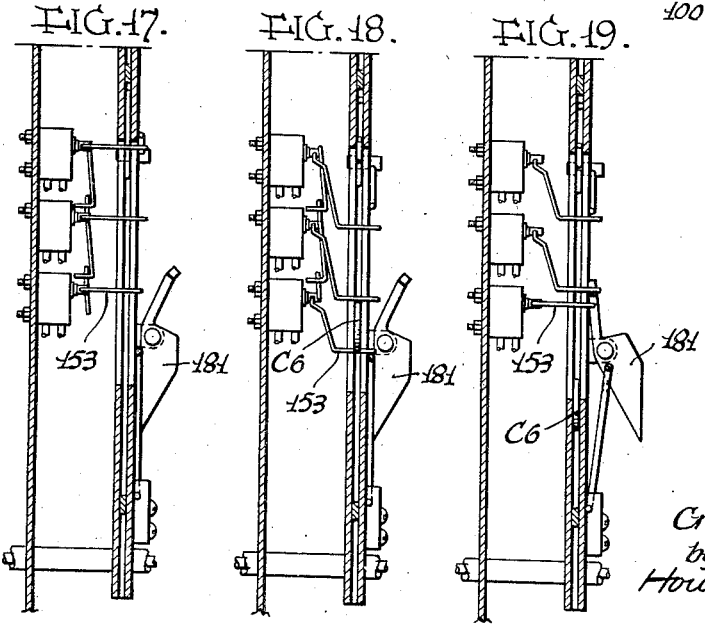

Feb. 5, 1957     C. W. HATCHER     2,780,336
COIN CHANGING APPARATUS
Filed April 3, 1950     13 Sheets-Sheet 4
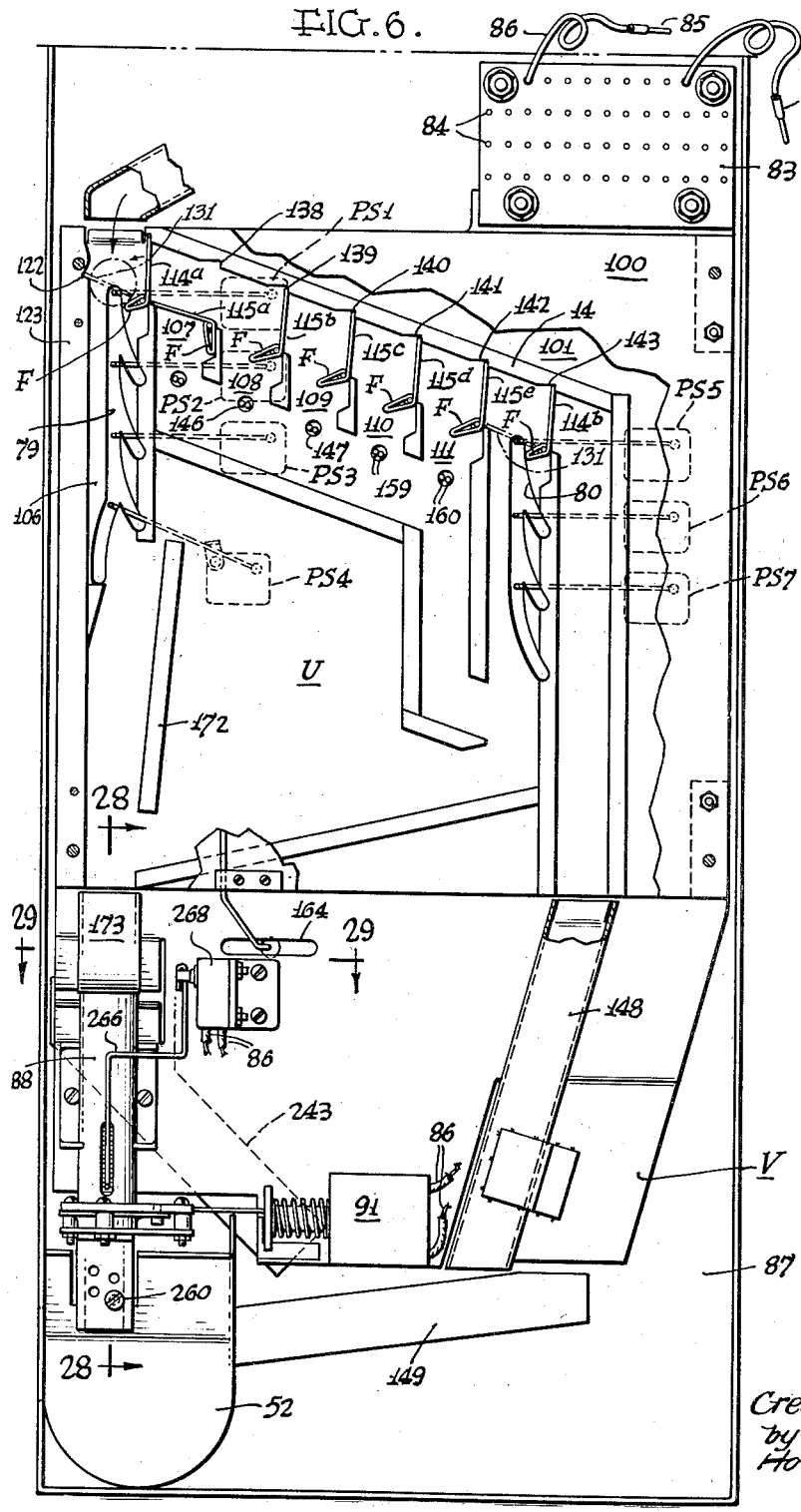
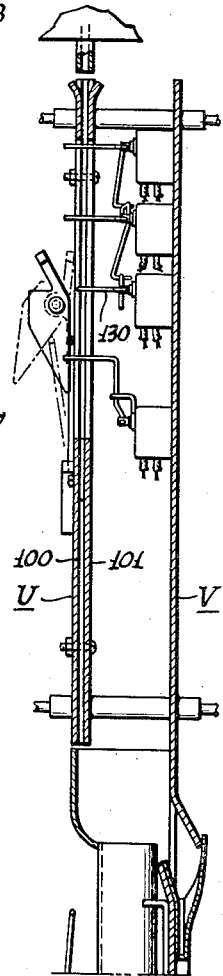
Inventor:
Creel W. Hatcher
by his Attorneys
Howson &
Howson

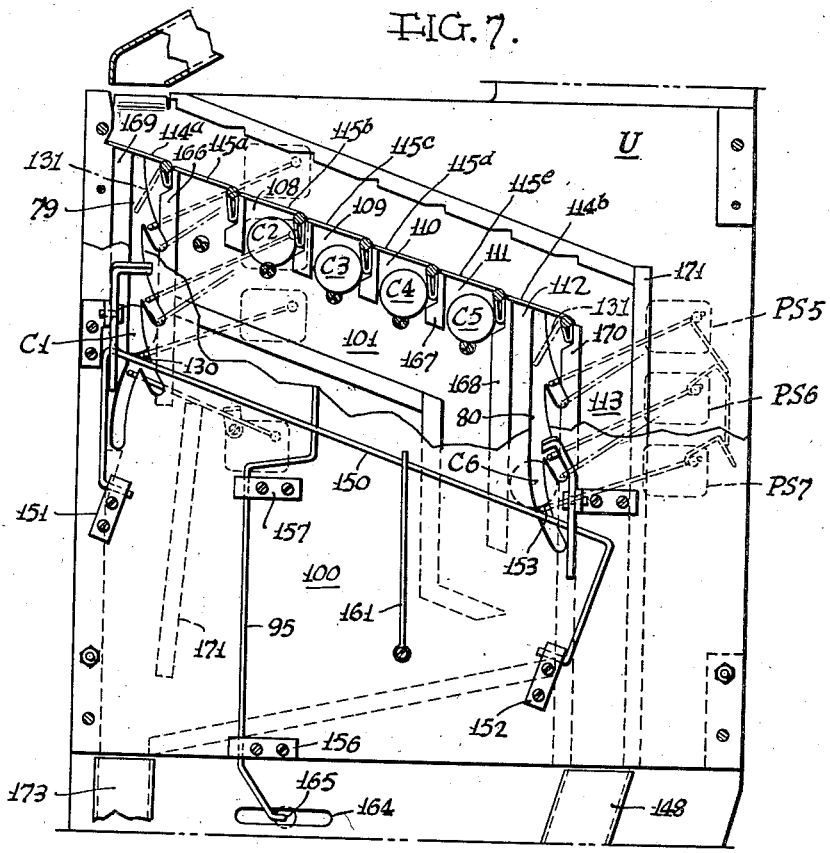

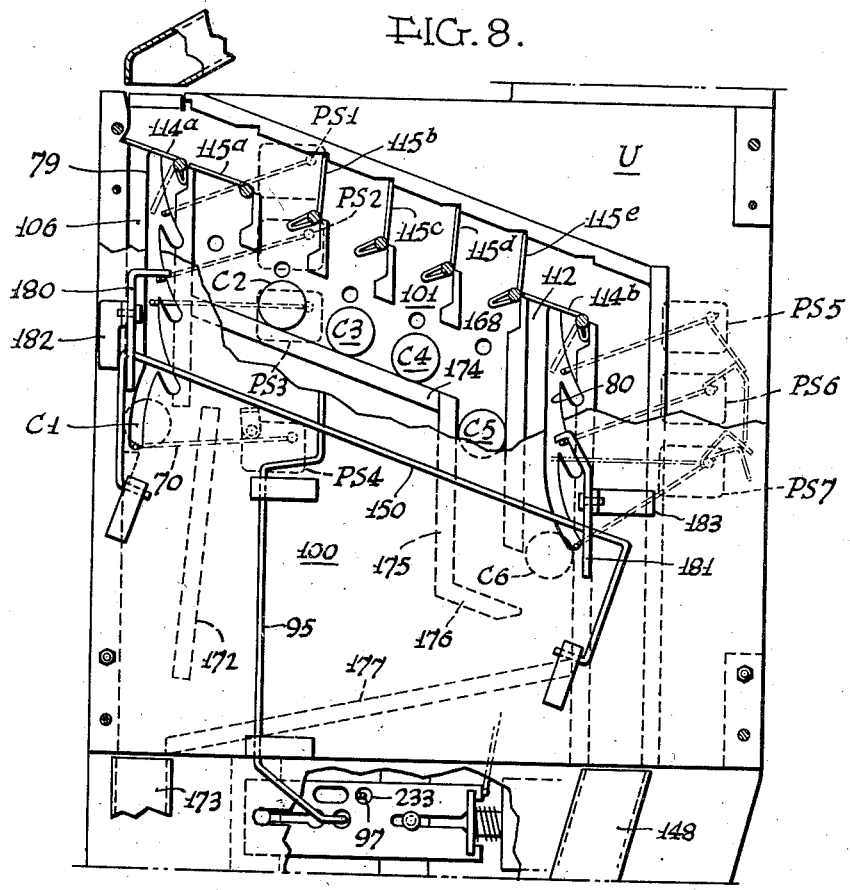
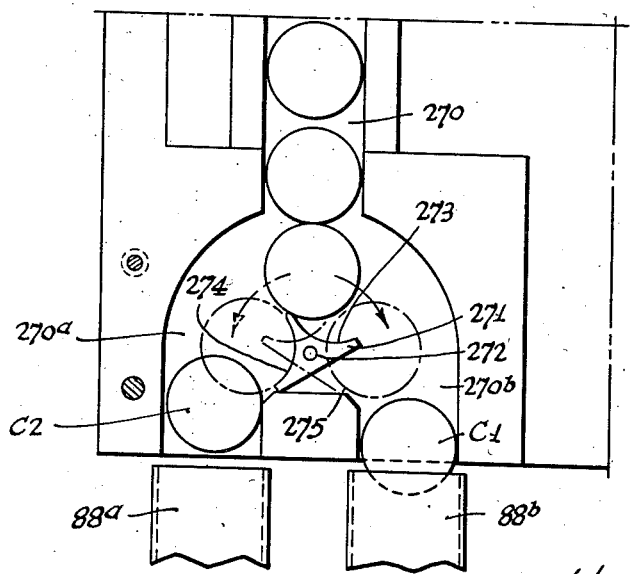

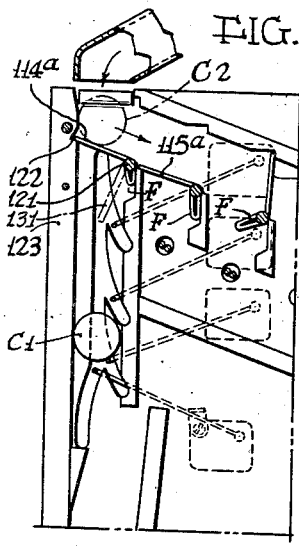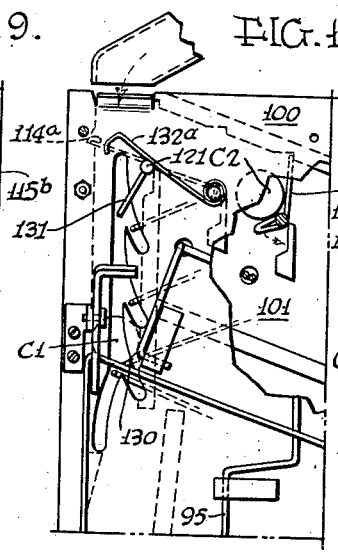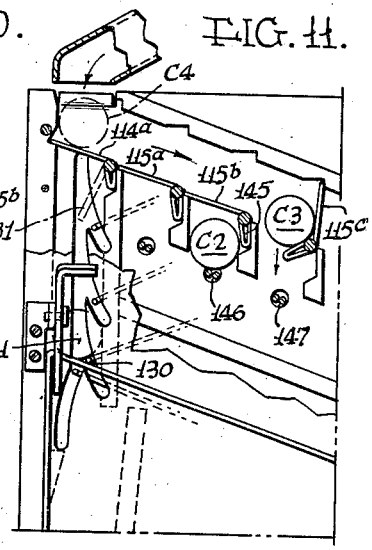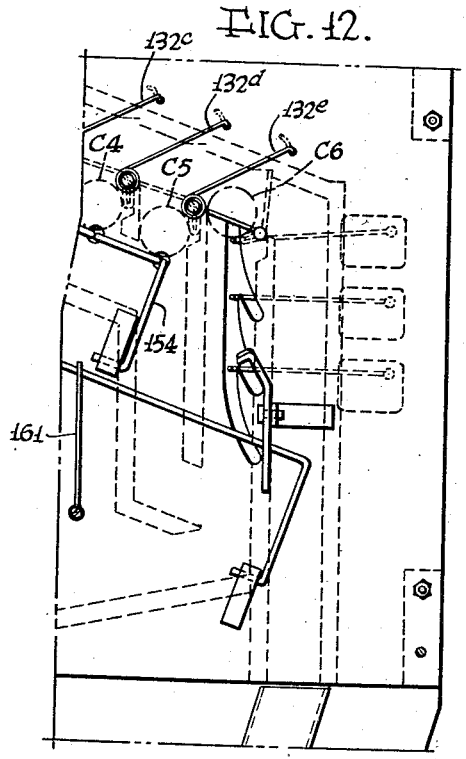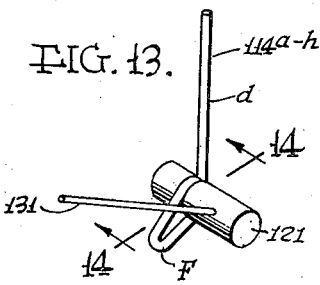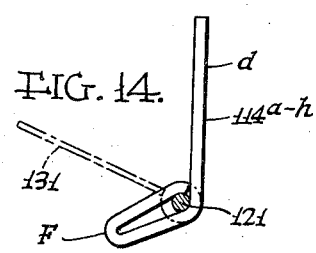

Feb. 5, 1957 C. W. HATCHER 2,780,336
COIN CHANGING APPARATUS
Filed April 3, 1950 13 Sheets-Sheet 8

Inventor:
Creel W. Hatcher
by his Attorneys
Howson & Howson

Feb. 5, 1957　　　　　　　　　C. W. HATCHER　　　　　　　　2,780,336
COIN CHANGING APPARATUS
Filed April 3, 1950　　　　　　　　　　　　　　　　　13 Sheets-Sheet 9
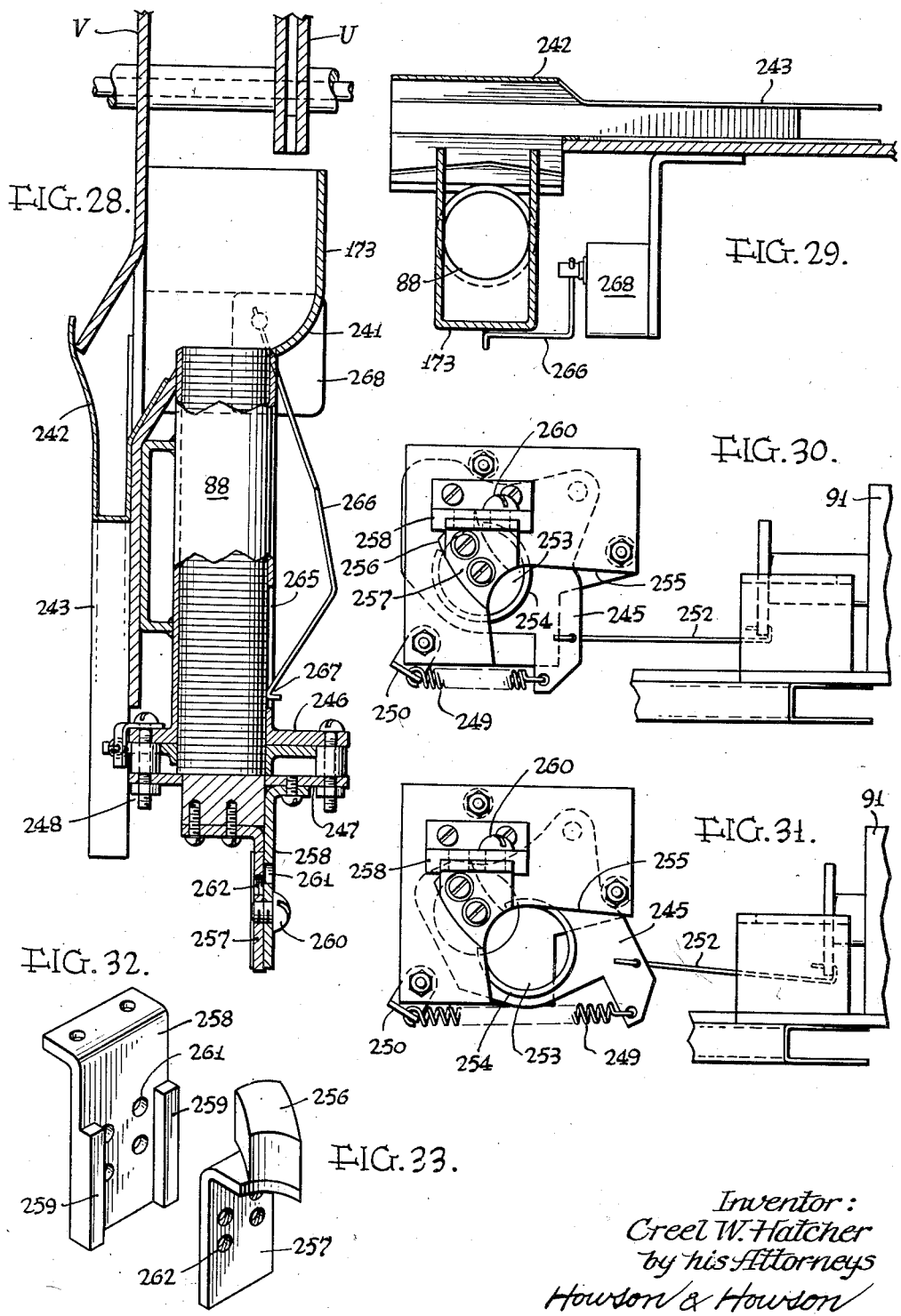
Inventor:
Creel W. Hatcher
by his Attorneys
Howson & Howson Feb. 5, 1957
C. W. HATCHER
2,780,336
COIN CHANGING APPARATUS
Filed April 3, 1950
13 Sheets-Sheet 10
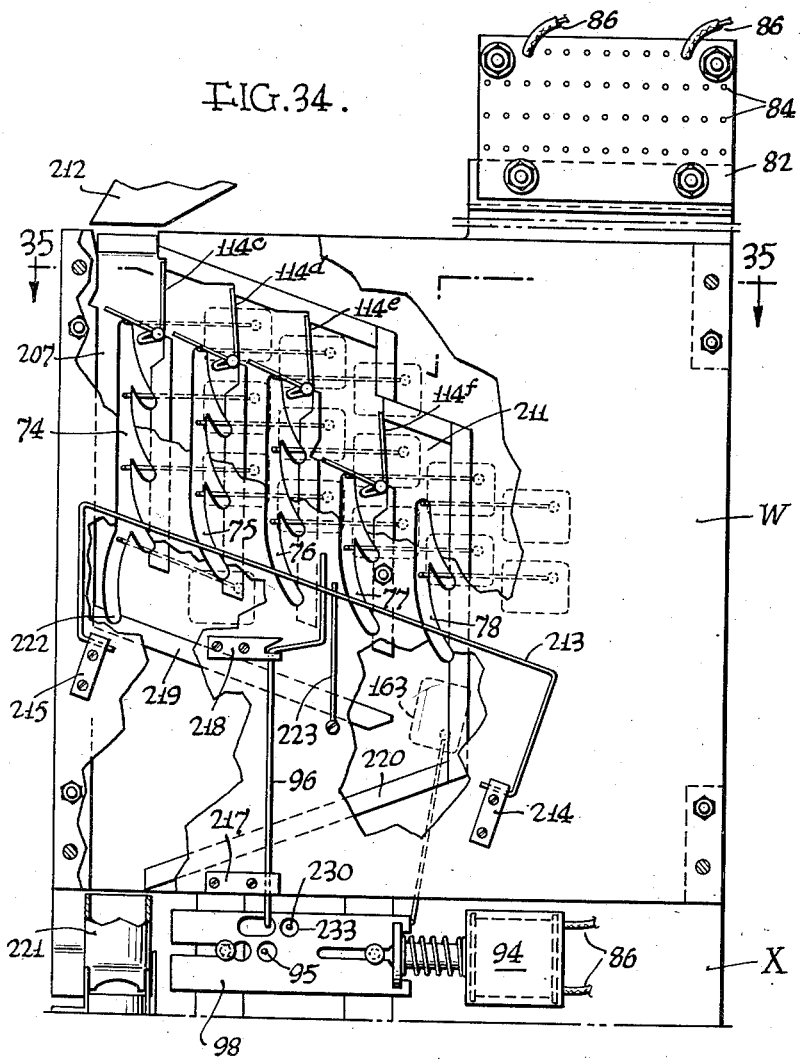
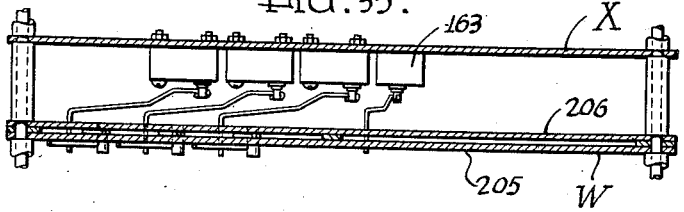
Inventor:
Creel W. Hatcher
by his Attorneys
Howson &
Howson

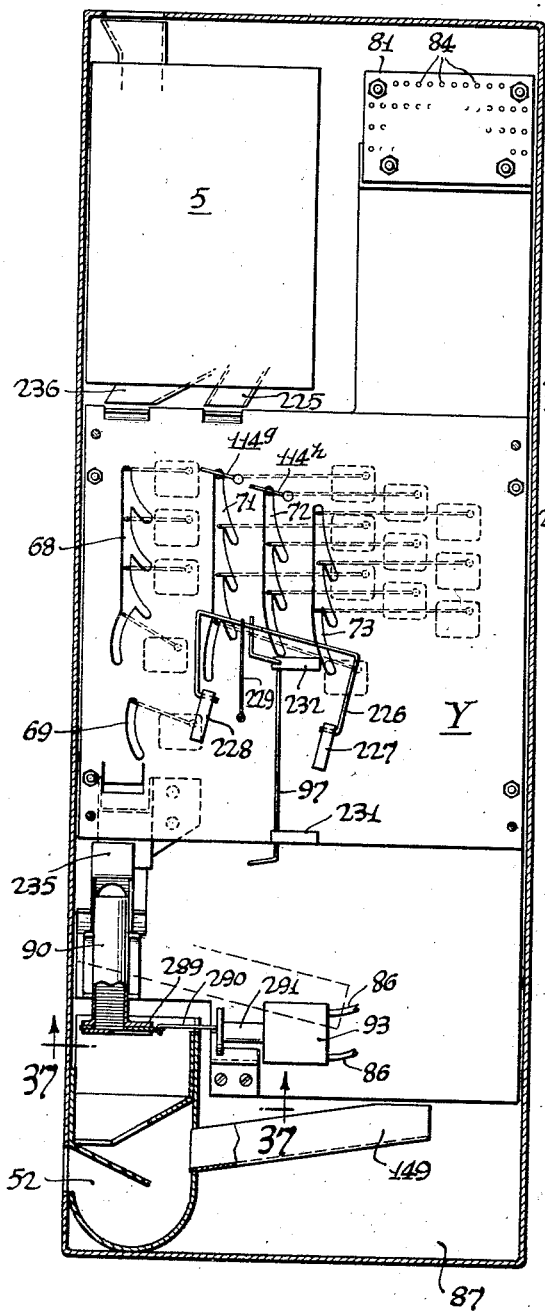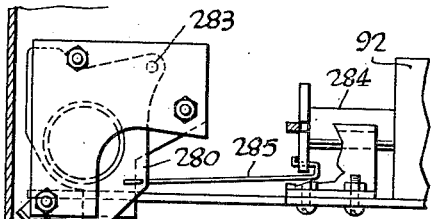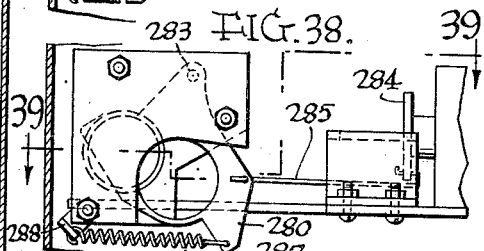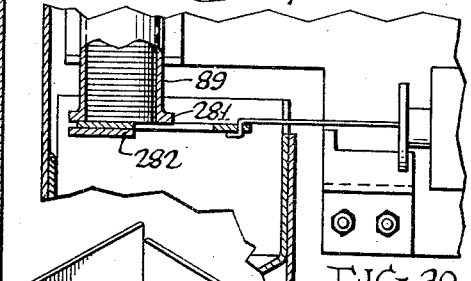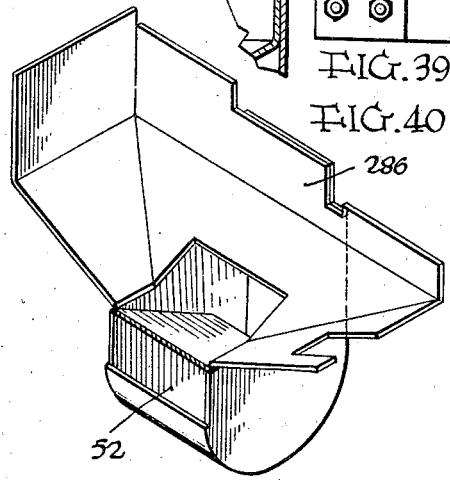

Feb. 5, 1957 C. W. HATCHER 2,780,336
COIN CHANGING APPARATUS
Filed April 3, 1950 13 Sheets-Sheet 12
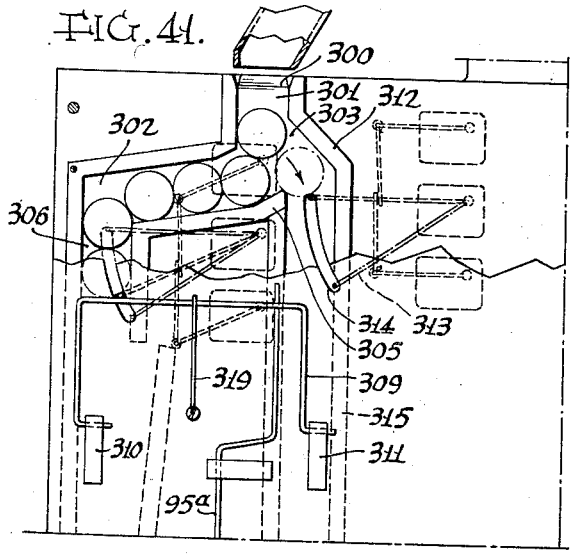
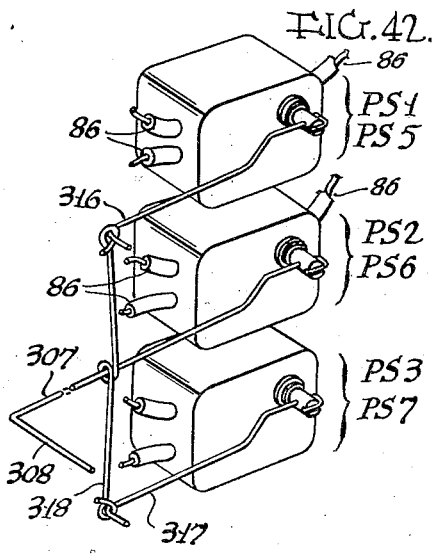
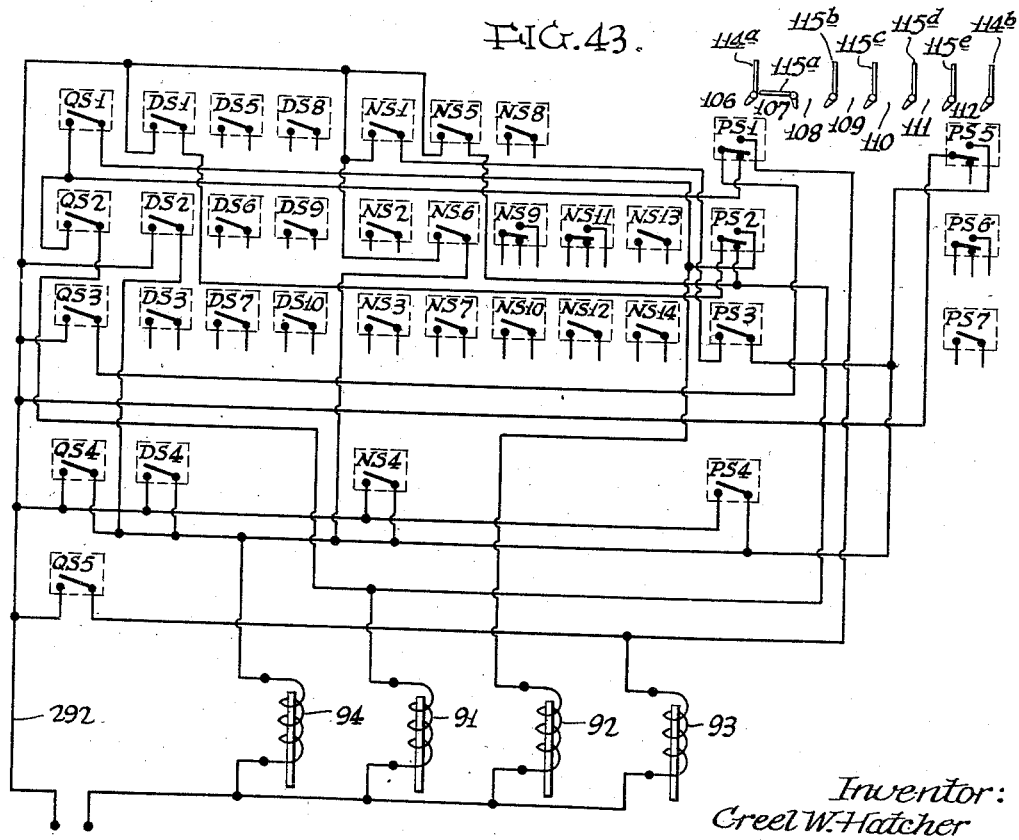
Inventor:
Creel W. Hatcher
by his Attorneys
Howson & Howson

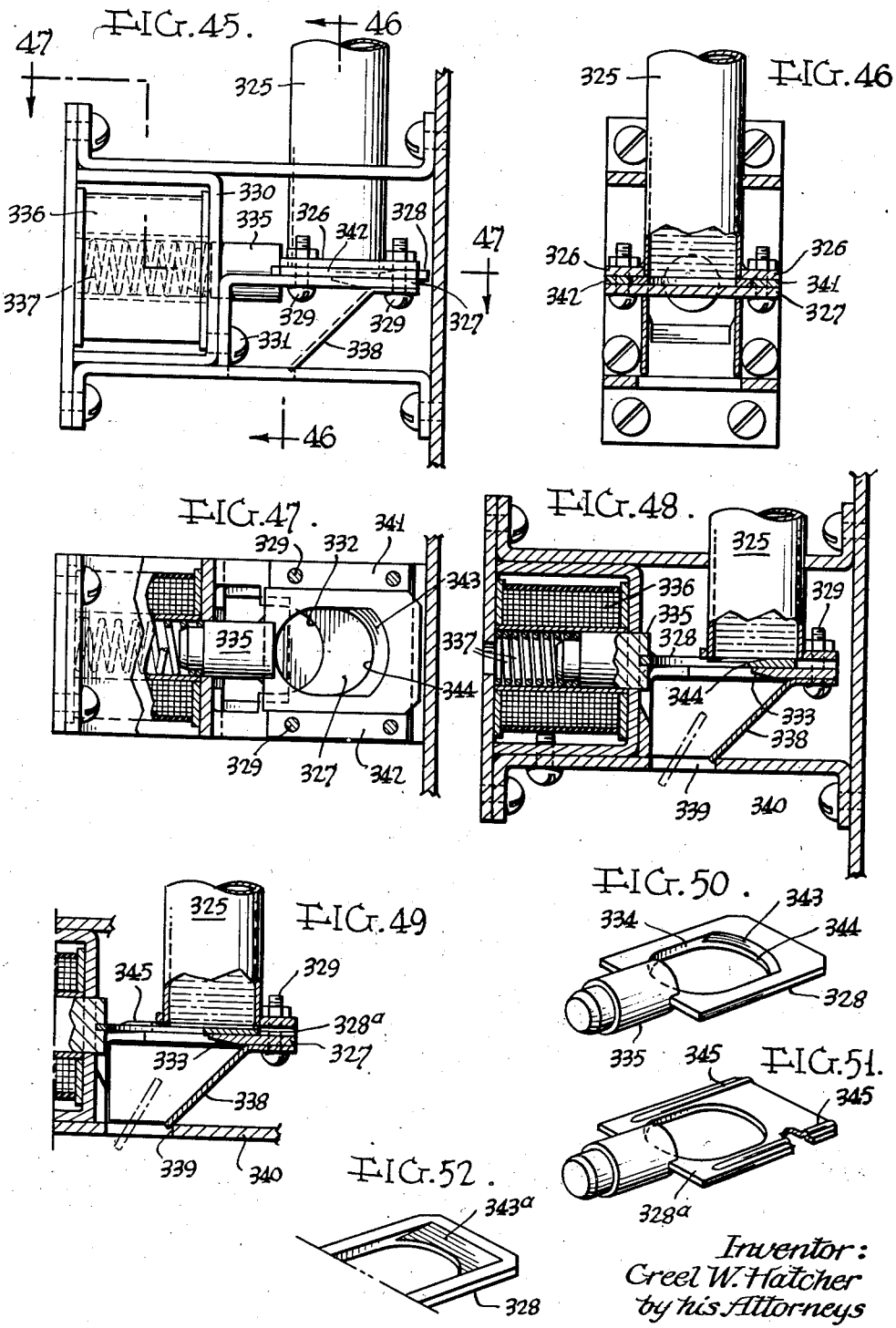

United States Patent Office 2,780,336
Patented Feb. 5, 1957

2,780,336

COIN CHANGING APPARATUS

Creel W. Hatcher, Valley Forge, Pa.

Application April 3, 1950, Serial No. 153,693

16 Claims. (Cl. 194—10)

This invention relates to coin handling apparatus and is intended primarily for use with automatic vending machines.

Coin handling devices heretofore proposed have been characterized by several serious disadvantages. One of the most serious objections to prior machines has been that they have been unreliable. The second objection has been that they have been extremely complicated and expensive, and a third limitation has been in the range of prices and coins which could be handled by one machine. For example, I know of no automatic vending machine capable of vending merchandise at odd penny prices such as 6¢, 7¢, 16¢, 23¢ etc., by accepting any possible denomination or combination of denominations and returning the correct change, if any, to the purchaser.

The present apparatus is characterized by relatively simple, foolproof mechanism considering the wide range of adjustments. It is small in size and light in weight. Its almost infinite range and capabilities permit successful adaptation to practically any situation where coins are handled. Some of the broad categories to which the present apparatus may be successfully applied are vending and dispensing mechanisms such as newspapers, candy, soft drinks, cigarettes, hot beverages, wearing apparel; admission or entrance devices such as ticket selling machines, turnstiles and gates for theaters, sporting events, amusements, and any gathering for which admission is charged. Another large category has to do with food dispensing mechanisms in self-service markets and also in self-service restaurants such as "automats." With slight modifications, the device may be used by itself purely as a change-making machine which could be installed in locations convenient to public places where specific denominations of coins are required—for example, telephones, wash rooms, and laundries.

A primary object of the present invention therefore, is to provide an improved coin handling apparatus capable of accepting specified coin denominations so that any desired mechanism may be set in motion when a predetermined combination or number of coins has been accepted by the apparatus.

Another object of the present invention is to provide a coin handling device capable of being set at a predetermined amount and thereafter receiving any combination of coins until that amount has been reached exactly or until the last coin reaches and exceeds the set amount. Additional coins will be returned, together with any change that may be due by reason of the difference in the set amount and the total amount accepted by the machine.

A further object of the invention is to provide in a coin handling machine, mechanism that is activated by means of electrical switches when a predetermined number of coils have been inserted into the machine.

A further object of the invention is to provide in a coin handling machine, mechanism whereby no more than a predetermined number of coins will be accepted or retained by the machine.

A further object of the invention is to provide a coin handling device which returns a particular denomination coin in change when the proper coins have been deposited and accepted by the machine. For example, assume that the sales or dispensing price is set at 21¢ and that the customer has a penny and a quarter. He may insert the quarter and receive four pennies in change or if he wishes a nickel in change, he may insert the penny first and then the quarter, in which case the machine will return a nickel in change.

A further object of the invention is to provide a completely foolproof, relatively inexpensive machine capable of handling all combinations of coins and of returning correct change and surplus coins which are deposited over and above a predetermined amount.

A further object of the invention is to provide a switch controlled coin handling device in which a plurality of switches are mechanically actuated by the falling of coins through selected chutes.

A further object of the invention is to provide an improved coin barrel for use in coin handling apparatus.

A further object of the invention is to provide an improved coin dispensing mechanism for a coin barrel.

A still further object of the invention is to provide suitable electrical control devices to prevent acceptance of surplus coins and to insure the return thereof.

Further objects will be apparent from the specification and drawings in which:

Fig. 1 is a perspective showing the coin handling apparatus of the present invention assembled in a suitable cabinet or case, which may be attached to or incorporated in a vending or dispensing machine;

Fig. 2 is an end view of the structure of Fig. 1, with the side panel of the cabinet broken away;

Fig. 3 is a transverse section as seen at 3—3 of Fig. 2;

Fig. 4 is an exploded view of the structures of Figs. 1–3 showing the relative positions of the various coin chute and switch panels;

Fig. 5 is a side view of the penny chute panel shown at the extreme right of Fig. 4, and as seen at 5—5 of Fig. 2;

Fig. 6 shows the penny chute panel of Fig. 5 partly broken away and mounted on its associated penny switch panel, as seen at 6—6 of Fig. 2;

Fig. 7 is a side view of the penny chute panel of Fig. 6 but broken away in a different area;

Fig. 8 is a side view of the penny chute panel similar to Fig. 7 but showing the pennies immediately after release by the temporary retaining element;

Fig. 9 is a fragmentary detail of the structure of Fig. 8, showing the position of the mechanism of the penny chute panel after the first penny has been accepted by the machine;

Fig. 10 is a view similar to Fig. 9 showing additional structure on the penny chute panel when the first penny has been accepted by the machine and when the second peenny is about to be received in the proper vertical chute;

Fig. 11 is a view similar to Fig. 10 showing the third penny about to be received into the proper vertical chute;

Fig. 12 is a side view of the penny chute panel showing the last penny about to be received into the proper vertical coin chute;

Fig. 13 is a perspective on an enlarged scale of one of the vertical coin chute gates;

Fig. 14 is a section as seen at 14—14 of Fig. 13;

Fig. 15 is a vertical sectional detail as seen at 15—15 of Fig. 5;

Fig. 16 is an enlarged transverse sectional detail as seen at 16—16 of Fig. 5;

Fig. 17 is an enlarged vertical sectional detail as seen at 17—17 of Fig. 5;

Figs. 18 and 19 are views similar to Fig. 17 but showing the mechanism in moved positions corresponding to progress of the coin through the chute;

Fig. 20 is an enlarged sectional detail as seen at 20—20 of Fig. 5;

Fig. 21 is a view similar to Fig. 20 with the temporary coin retaining element in a moved position, in which all the coins are permitted to drop through the chutes;

Fig. 22 is an enlarged sectional detail corresponding to Fig. 20, as seen at 22—22 of Fig. 5;

Fig. 23 is a view similar to Fig. 22, and corresponds to Fig. 21 in which the coins are permitted to drop through the chutes;

Fig. 28 is an enlarged vertical sectional detail as seen at 28—28 of Fig. 6;

Fig. 29 is a transverse sectional detail as seen at 29—29 of Fig. 6;

Fig. 30 is a bottom view of the structure of Fig. 28;

Fig. 31 is a view similar to Fig. 30, showing the apparatus in a moved position preparatory to ejecting one or more coins from the coil barrel;

Figs. 32 and 33 are perspectives showing the parts of the structure of Fig. 28 which control the number of coins ejected from the coil barrel in one operation;

Fig. 34 is a side view of the nickel chute panel mounted on its associated switch panel;

Fig. 35 is a transverse section as seen at 35—35 of Fig. 34;

Fig. 36 is a side view as seen at 36—36 of Fig. 2 of the combined dime and quarter panel with its associated switch panel mounted in the cabinet;

Fig. 37 is a fragmentary bottom view as seen at 37—37 of Fig. 36;

Fig. 38 is a view similar to Fig. 37, with the structure in a moved position;

Fig. 39 is a fragmentary detail partly sectioned, as seen at 39—39 of Fig. 38;

Fig. 40 is a perspective of the coin return box;

Fig. 41 is a fragmentary view similar to Figs. 6 and 7, showing a modified form of penny chute;

Fig. 42 is a perspective showing a modified interlocking means for one of the switch units;

Fig. 43 is a wiring diagram for a set price of six cents;

Fig. 44 shows a modified lower chute construction using two coin barrels;

Fig. 45 is an enlarged sectional detail showing in elevation a modified stripper plate mechanism;

Fig. 46 is a sectional elevation as seen at 46—46 of Fig. 45;

Fig. 47 is a section as seen at 47—47 of Fig. 45;

Fig. 48 is similar to Fig. 45 but showing the stripper plate in a moved position;

Fig. 49 is a view similar to Fig. 48 using a modified stripper plate;

Fig. 50 is a perspective of the stripper plate shown in Figs. 45–48;

Fig. 51 is a perspective of the stripper plate shown in Fig. 49; and

Fig. 52 is a fragmentary perspective of a still further modified stripper plate.

Figure 26:
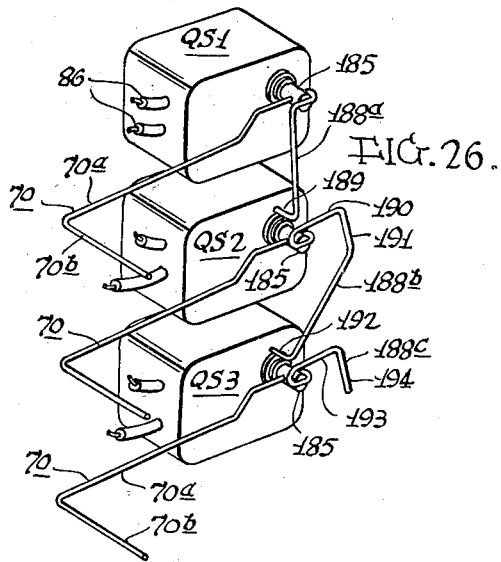
Fig. 26 is a perspective of the switches shown in Figs. 24 and 25 in the normal position.

Referring now more particularly to the drawings, a coin handling apparatus constructed in accordance with the present invention may be contained in any convenient case or cabinet 50 which is provided with a hinged cover 51, a coin return 52, and one or more coin intake slots 53 and 54. Since the coin mechanism contemplated in the present invention is primarily intended to be used in conjunction with a vending or dispensing machine, I have shown a suitable motor 55 which is controlled by a relay or switch through electrical leads 56, 56 and which may be used to actuate any desired dispensing apparatus by means of motor shaft 57. A time control mechanism (not shown) for motor 55, is connected in the dispensing circuit so that the "on" cycle of the motor is of sufficient duration to actuate the particular dispensing device to which the motor may be connected. An electrical connection 60 serves to actuate the electrical system of the coin changing device.

It will be understood that for the purpose of clarity and brevity, there is described hereinafter an apparatus capable of handling all combinations of pennies, nickels, dimes and quarters when the sale price or the price at which motor 55 initiates the dispensing cycle is set at any value from one through twenty-five cents. It will be apparent that mere duplication of the various coin panels and an increase in the number of wiring connections will enable the machine to handle half-dollar coins and the sales price may also be set at any desired amount, either from within or from without the cabinet.

Briefly, a coin handling apparatus so constructed as noted above, has four more or less independent cooperating units. The first of these units is known as a coin selector, sometimes called a coin rejector, and forms no part of the present invention. Devices of this sort are well known in the art and the following U. S. patents describe illustrative examples thereof: Nos. 1,923,535, 1,956,066, 2,073,260, 2,073,261, 2,186,862, and 2,186,863. Some coin selectors of this type are supplied to handle only nickels, dimes and quarters, in which event these three coins would be inserted in slot 53, and pennies would be inserted in slot 54. In the event the coil selector S is capable of handling all four denominations of coins—namely pennies, nickels, dimes and quarters—then slot 54 is unnecessary. It will be understood however, that a coin selector of any sort is not essential to the operation of the present invention, since individual slots for the coins may be substituted if desired.

The second unit consists of a penny chute panel U and penny switch panel V (Fig. 4). The third unit consists of the nickel chute panel W and the nickel switch panel X.

The fourth unit comprises the dime and quarter chute panel Y and the dime and quarter switch panel Z.

When the coins have been properly classified by the selector S and/or by insertion in their proper slots 53 or 54 as the case may be, they are directed to the appropriate panels U, W and Y, depending upon the denomination of the coin. It will be noted that in the present machine, it is possible to include both the quarter and dime chutes on one panel, since the number of switches and auxiliary chutes required for the higher denomination coins is considerably less than for the lower denomination coins.

The coin selector is provided with suitable control means so that if the coin handling mechanism becomes empty or jammed for any reason, the coins are not directed into any of the panels, but are by-passed and returned by the selector directly to the coin return box 52 through a chute 63 which is shown mounted on the nickel switch panel X in Fig. 4. In a coin changing machine such as the present, there is one other instance when it becomes desirable to by-pass the coins directly to the return box 52. This is when there are not sufficient coins in one or more of the coin barrels to make the required change. A suitable mechanism, which will be described more fully hereinafter, is associated with the barrel in such a way that if the number of coins in the penny barrel, for example, becomes less than that needed to make change, any more coins put in the machine are delivered at once to the return box 52 through chute 63.

Although the various units for the different coin denominations are somewhat different from each other, they all utilize the weight of the coin or coins to close one or more micro-switches which are mounted on the associated switch panels and which have switch arms or fingers extending through slots into the vertical coin chutes in the chute panels. The first coin introduced into any particular chute panel falls directly into the first vertical chute and in so doing, closes a gate at the top of the chute. It then falls downwardly to displace one or more (usually three) micro-switch fingers, whereupon the coin temporarily comes to rest against a stop or retainer near the bottom of the chute. The construction of the micro-switch fingers is such that the fingers are automatically interlocked and remain interlocked to keep the switches closed until the coins are released from the bottoms of the chutes. In some of the panels, the second and subsequent coins are directed laterally into a downwardly sloping chute and thence successively into adjoining vertical chutes by reason of the automatic closing of a gate or trapdoor at the top of the preceding vertical chute. This filling of the vertical chutes in the chute panel continues in the various panels until the predetermined sales price or setting has been exactly reached or exceeded.

When the last switch is closed by the coin which equals or exceeds the sale price, a solenoid is energized to retract the coin retainers and thus permit the coins to fall from the vertical chutes into the coin barrels or the money box as the case may be. Also other solenoids are energized to return the correct amount of change to the coin return box and to start the motor 55 for the dispensing or vending mechanism.

Figure 27:
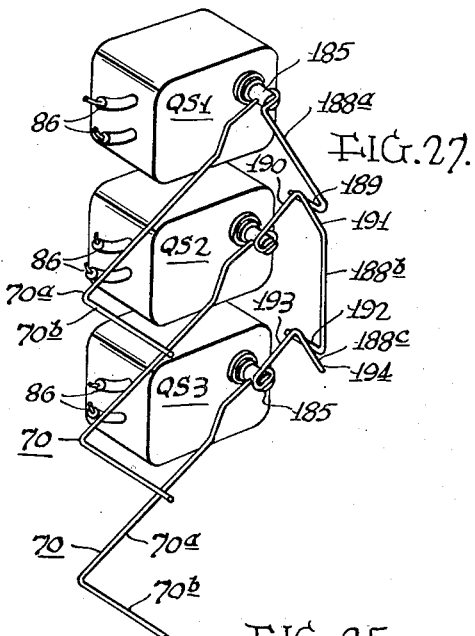
Fig. 27 is a perspective similar to Fig. 26 with the switches in the interlocked position.

I have found that a somewhat modified arrangement of the chutes can advantageously be employed to conserve space where this factor is of importance. In this modification, the coins themselves serve as the temporary retaining means and instead of the coins being channeled individually and dropped in parallel, they are held in series so that it is only necessary to retain the first of any desired number of coins. In either event, the switches which are actuated by the passage of the coins in the chutes, are controlled by one or more fingers or switch arms which are bent as shown in Figs. 26, 27 and 42, so that either the finger for each individual switch or a master control finger for a plurality of switches, protrudes through aligned slots in chute panels U, W and Y.

Fig. 4 shows the quarter and dime switch panel Z in position in the cabinet 50 and it will be noted that the quarter switches QS1, QS2, QS3, QS4 and QS5 are arranged in a substantially vertical row at the left of panel Z and in laterally spaced relation to slots 68 and 69. All of the switches have fingers or arms designated generally by the numeral 70, which move arcuately and extend through their associated slots in the panels. In the case of the quarter switches, it will be noted that switches QS1, QS2, QS3 and QS4 have fingers 70 which move in slot 68, whereas switch QS5 is provided with a separate slot 69.

The dime switches DS1, DS2, DS3 and DS4 are arranged in a second vertical row on switch panel Z and have fingers 70, 70 which protrude through slot 71 on panel Y. The second column of dime switches DS5, DS6 and DS7 have fingers which protrude through slot 72 in panel Y, and the third column of dime switches DS8, DS9 and DS10 have fingers which protrude through slot 73.

The nickel switches on panel X are arranged in five vertical columns, the first one of which comprises switches NS1, NS2, NS3 and NS4, the fingers of which operate in slot 74 on panel W. The second column of nickel switches NS5, NS6 and NS7 cooperates with slot 75; the third column NS8, NS9 and NS10 cooperates with slot 76; the fourth column NS11, NS12 with slot 77; and the fifth column NS13 and NS14 cooperates with slot 78.

The penny switch panel V has only two switch groups, the first of which comprises switches PS1, PS2, PS3 and PS4 which cooperate with slot 79 on panel U, and the second of which comprises switches PS5, PS6 and PS7 which cooperate with slot 80.

Each switch panel is provided with suitable means for selectively connecting and disconnecting the wires to the various switches so that a wide variety of circuits may be readily employed. In the present form, the circuit changing devices are located internally of case 50. However, it will be understood that this is not essential. Junction blocks 81, 82 and 83 are mounted on switch panels Z, X and V respectively. Each block has a plurality of jacks 84, 84 in which the plugs 85, 85 on the various switch and solenoid wires, designated generally by 86, 86, may be inserted in accordance with the various circuits to be described more fully hereinafter. The coins finally come to rest in the coin box 87 in the bottom of case 50 or in coin barrels 88, 89 and 90 mounted on panels V, X and Z respectively. The coin barrel assemblies are adapted to receive coins from the chute panels U, W and Y. When the coin barrels are filled, additional coins from the chute panels are carried into the coin box 87 in the bottom of cabinet 50 and the barrels 88, 89 and 90 dispense coins into the coin return box 52 when their associated solenoids 91, 92 and 93 are energized.

The nickel switch panel X also carries a trip solenoid 94 which when energized, serves to release all the coins from the panels U, W and Y by means of crank rods 95, 96 and 97 which are operatively connected to the trip plate 98 of the armature of solenoid 94. The exact manner in which the various coins are retained and released in the chute panels, will be more fully explained hereinafter.

To summarize therefore, coins inserted into the machine through slots 53 and 54 are directed in accordance with the denomination of the coin to the appropriate chute panel U, W or Y. These coins are temporarily retained in the panels until a predetermined setting has been either reached or exceeded. As soon as this occurs, the various circuits energized by the closing of certain switches release the proper amount of change from one or more of the coin barrels 88, 89 or 90. The dispensing mechanism is energized or set in motion and the coins in the chute panel are permitted to drop into the barrels 88, 89 and 90, or into the bottom 87 of cabinet 50.

Since the various panels all operate on exactly the same principle, the differences being such as may be required to accommodate the possible number of coins that may be used to make up any predetermined amount within the range of the machine, it is believed sufficient to describe in detail only one of the panel assemblies. For this purpose, I have selected the penny panels U and V and the exact manner in which they operate. It will therefore be understood that the nickel, dime and quarter panels are inherently similar and that mere duplication in the construction and operation of the other panels will be omitted in the interests of clarity.

Referring now to Figs. 5–27 (Sheets 3–8), the penny chute panel U shown in elevation in Fig. 5, is formed from two closely spaced plates 100 and 101 which are held together by posts 102, 102 and suitable spacers 103, 103. The distance between the plates 100 and 101 is just sufficient to permit free passage of a penny. Both plates 100 and 101 are flared outwardly at 104 in order to receive coins from an intermediate chute 105 (Fig. 2) which is used in the event that a separate penny slot 54 is provided. If the coin selector S is of the type capable of sorting pennies, it may be extended over mouth 104 (as shown in broken lines in Fig. 2) in which event the intermediate chute 105 and slot 54 are eliminated. The gap between plates 100 and 101 encloses a plurality of chutes to carry and direct the coins that are delivered into the mouth 104. The first of these is a substantially vertical chute 106 which catches the first coin C1 introduced into the mouth 104 after a previous sequence of operations has been completed. Secondary parallel chutes 107, 108, 109, 110, 111, 112 and 113 are successively lower so that their upper ends are in downwardly sloping relation to the top of chute 106. Each chute 106–113 has a gate or trap door 114a, 115a, 115b, 115c, 115d, 115e and 114b which directs a coin into its associated chute and then closes the chute behind each coin to direct the next successive coin downwardly to the adjacent vertical chute. The first coin entering mouth 104 of panel U drops directly downward until it contacts the foot F of gate 114a (Figs. 6 and 13). This pivots the gate with its shaft 121 until the door d rests in the notch 122 in the side 123 of chute 106 (shown in Figs. 9 and 10). At or about the time that the coin C1 strikes foot F, it also engages finger 70 of the first micro switch PS1. Continued falling of coin C1 causes it to likewise engage the finger of the second switch PS2 and subsequent falling causes it to engage the finger of the third switch PS3.

The first coin or penny C1 finally comes to rest against the right-angle extension 130 (Fig. 15, Sheet 4 and Fig. 7, Sheet 5) of finger 70 on switch PS3 which is retained by release rod 150 (Fig. 7) from completely clearing chute 106 so that the penny C1 is temporarily retained in the chute. During the downward movement of penny C1, each of the three switches PS1, PS2 and PS3 is closed and held closed, as will be described more fully in conjunction with Figs. 24–27.

There are two types of gates used which although slightly different, perform the same function and in substantially the same manner. Figs. 13 and 14 illustrate the 114 type of gate which has a gate or door d, foot F, shaft 121 rigidly attached thereto, and a returning arm or lever 131 mounted near one end of shaft 121. The switch fingers are all spring-loaded to close the switches, and the 114 type of gate is closed against the tension of the switch springs merely by the weight of the coin on foot F. However, as soon as the coin has passed from the foot F and when the switch finger is released, the tension of the switch spring (not shown) acting through the finger on arm 131, pivots the gate and shaft 121 to the initial upright or open position. It will thus be apparent that whenever there is a switch finger near the top of a chute, the switch spring is utilized to return the gate for that chute to its initial position. However, in the penny panel, five of the chutes have no switches associated therewith so that it becomes necessary to provide other means for opening the gates. For this purpose, I use very light hair springs 132a, 132b, 132c, 132d and 132e (Fig. 5). The ends of springs 132a–132e may be hooked in associated apertures 133, 133 in panel 100. In the event it may be desired to retain one or more gates of the 115 type permanently closed (for example the gate 115a, as shown in Fig. 6) it is only necessary to unhook the hair spring associated with the gate from its aperture 133 in plate 100 (Fig. 5). This in turn renders the arms 131 on the 115 type of gate unnecessary so that the 114 and 115 gates are exactly alike except for the absence of a spring on the 114 type and the substitution of a spring for the returning arm 131 on the 115 type.

In order to retain all the gates in an upright position when released, the extremities of the doors D seat in suitable notches 137, 138, 140, 141, 142 and 143 in upper chute rail 144 (Fig. 6) and a similar construction is present for the nickel and dime gates.

Since gate 115a is closed (as shown in Fig. 6) the second penny C2 rolls over door D of gate 115a and then strikes the raised or open gate 115b. Its lateral movement is thus arrested and the weight of the coin is transferred to the foot F of gate 115b. This weight is sufficient to overcome the tension of hair spring 132b so that the penny drops down vertical chute 108 until it strikes the retainer 146 which however, is in proper vertical spaced relation with respect to gate 115b to retain the gate 115b closed by means of lateral pressure on foot F (Fig. 11).

The third penny C3 which is accepted by mouth 104, repeats the process just described in connection with penny C2. In this case however, the third penny initially strikes closed gate 114a whereupon it rolls over closed gates 114a, 115a and 115b to strike open gate 115c. The third penny then comes to rest temporarily against the retainer 147 in chute 109. This process is repeated in the subsequent chutes 110 and 111 as the succeeding pennies C4 and C5 are introduced into mouth 104 (Fig. 7). The sixth penny C6 rolls over all of the previously closed gates 114a, 115a–115e until it strikes open gate 114b. The weight of penny C6 then closes gate 114b and the penny drops into and through chute 112, simultaneously closing gate 114b and switches PS5, PS6 and PS7 (shown in Fig. 7).

The above description is illustrative of the operation of penny chute panel U when it is set to accommodate six pennies. Intermediate settings are obtained by closing one or more gates 115a–115e. In any event however, where more than one penny makes up the sales price, the last penny of the sequence for which the panel is set must fall into chute 112 in order to actuate switches PS5, PS6 and PS7 (Figs. 6 and 8, Sheets 5 and 6). Chute panel U in the present case is provided with a total of seven vertical chutes so that all of the intermediate chutes 115a–115e may be opened by inserting spring 132a in aperture 133 (Fig. 5) so that a sales price of seven cents may be used.

In the event that the last penny of the set price and one additional penny are inserted in rapid succession so that the dispensing cycle is not completed before the excess coin falls into mouth 104, all gates 114a through 114b will be closed (as shown in Fig. 7). The excess coin then passes over all chutes 106–112 and falls into vertical chute 113 (Fig. 7, Sheet 5), which communicates directly with the coin return box 52 through chutes 148 and 149 (Fig. 6, Sheet 4). In order to follow the sequence of operations for a typical chute panel, let us assume that the penny chute panel U has been set to accept six pennies. In other words, one of the gates 115a–115e is closed by releasing its associated spring. The first penny C1 drops into chute 106 as shown in Fig. 9, and comes to rest against extension 130 on finger 70 of switch PS3. This closes and locks all three switches PS1, PS2 and PS3. Extension 130 protrudes through slots 72 and abuts a release rod 150 which is pivoted (Figs. 7 and 8, Sheets 5 and 6) in brackets 151, 152 on the outside of plate 100. The subsequent pennies C2–C5 are received in the vertical chutes 108–111 respectively (shown in Fig. 7). The sixth penny C6 falls into chute 112, and after closing switches PS5, PS6 and PS7 comes to rest against the right angle extension 153 of the finger 70 on switch PS7. Extension 153 abuts the release rod 150 in exactly the same manner as described in connection with extnesion 130, so that both act as retainers or stops for the coins C1 and C6.

A supplementary release rod 154 (Figs. 5, 22 and 23, Sheet 3) mounted in brackets 155, 155 is laterally displaceable by means of crank 95 mounted in brackets 156 and 157, and actuation of the crank 95 simultaneously displaces release rod 150. Since the temporary retainers 146, 147, 158, 159 and 160 are formed integrally with or on supplementary release rod 154 (Fig. 20, Sheet 5), all of the temporary retainers are withdrawn from within the chutes 107–111 (Figs. 21 and 23, Sheets 5 and 3, respectively) when crank 95 is turned. Springs 161 and 162 (Fig. 5, Sheet 3) cooperate with rods 150 and 154 respectively, to return them to their initial positions when no longer held by crank 95. Trip plate 98 (Figs. 4 and 34, Sheets 2 and 10) provides the means for actuating crank 95 and the release rods, and also serves to start motor 55 (Fig. 1) by closing switch 163. The end of crank 95 (Figs. 6, 7 and 34) extends through an aperture 164 in the penny switch panel V and is engaged in an aperture 165 on the trip plate 98 so that lateral movement of the trip plate pivots crank 95 and closes switch 163.

Fig. 7 shows six pennies in position in the penny chute panel U just before the release mechanism is actuated. In the event that an additional coin is required (for example, one or more nickels, dimes or quarters) the pennies remain as shown in Fig. 7, temporarily held in their respective chutes. However, let us assume that when penny C6 closes switch PS7, the set price has been reached. In this event, the solenoid 94 on nickel switch panel X (Figs. 4 and 34, Sheets 2 and 10) is energized to retract the trip plate 98 and to displace the release rod 150 and the supplementary release rod 154 as explained above.

As soon as the retainers 158, 146, 147, 159 and 160 (Fig. 20, Sheet 5) have been retracted from the bottoms of chutes 107–111, all the coins that may be in any of the intermediate chutes (for example pennies C2–C5) drop through and between vertical chute walls 166, 167, 167 and 168. On retraction of the supplementary release rod 154, release rod 150 is displaced to permit extensions 130 and 153 to swing downwardly in the lower arcuate portions of slots 79 and 80 respectively, so that coins C1 and C6 clear the walls 169 and 170 of chutes 106 and 112 (see Fig. 8, Sheet 6). In passing, it will be noted that chute walls 166, 167, 168 and 170 are all recessed at their upper extremity to receive the feet F, F on each gate. The above walls, together with wall 171 for chute 113, act as spacers between the front and rear plates 100 and 101 in the chutes.

Fig. 8 shows the position of the coins just after the release rods 150 and 154 have been pivoted to release the coins from the vertical chutes. Immediately after release, coin C1 continues to drop through the lower part of chute 106 and momentarily closes switch PS4 when it strikes the finger 70 of this switch. The fall of coin C1 is thus interrupted and it does not drop farther in the chute until it rolls to the right (as seen in Fig. 8) sufficiently far to clear the finger of switch PS4, thus holding switch PS4 closed for a matter of seconds, the reason for which will be more fully explained hereinafter. From thence it is guided by wall 172 downwardly into barrel funnel 173. The intermediate coins C2, C3 and C4 drop directly from the chutes 108–110 until they strike a sloping chute wall 174, whereupon they follow coin C5 down through chute 111 between walls 168 and 175. From thence they are directed by a second sloping wall 176 into the bottom of chute 112, whereupon they follow coin C6 down sloping wall 177 into funnel 173. When coin C6 is released, it moves finger 70 of switch PS7 downwardly until sufficient clearance is obtained between chute walls 168 and 170 for the coin to pass directly into contact with sloping wall 177.

It will be noted that the stop or retaining mechanism for coins C1 and C6 in chutes 106 and 112 is somewhat different from the retainer mechanism for the intermediate chutes. As has been previously explained, the extensions 130 and 153 on the fingers of switches PS3 and PS7 serve to stop downward movement of the coins C1 and C6 respectively, when the fingers have been pivoted to strike rod 150 which is spring-loaded to retain it in close contact with plate 100 (shown in Figs. 17 and 18, Sheet 3). Fig. 18 shows the coin C6 holding the finger 70 of switch PS7 against rod 150. It will be noted that in this position all the switches immediately above the retained coin—namely PS5 and PS6 in the case of coin C6, and switches PS1 and PS2 in the case of coin C1—are held in an interlocked, closed position. When the solenoid 94 is energized to release the coins, rod 150 is moved outwardly to the position shown in Figs. 19 and 23. This of course, automatically permits the coins in chutes 106 and 112 to displace the extensions 130 and 153 of switches PS3 and PS7 downwardly a distance sufficiently for the wires to clear.

In order to prevent switches PS1, PS2, PS5 and PS6 from opening before solenoid 94 is deenergized so that the correct change be returned when a higher denomination coin is used with a penny, two auxiliary catches 180, 181 pivoted in brackets 182 and 183 respectively, are associated with rods 150 so that when the rod is pivoted outwardly (as in Figs. 19 and 23, Sheet 3) catches 180 and 181 engage fingers 70, 70 of switches PS2 and PS6 to retain both these switches and the switches immediately thereabove (PS1 and PS5) closed. Likewise, in order to prevent extensions 130 and 153 of switches PS4 and PS7 from becoming caught underneath rod 150, switch PS4 holds solenoid 94 energized for a sufficient time to permit the fingers 70 of switches PS4 and PS7 to spring back to their upper positions. As long as this condition exists, catches 180 and 181 retain switches PS1, PS2, PS5 and PS6 closed. As soon as coin C1 clears finger 70 of switch PS4 and permits this switch to open, solenoid 94 is deenergized, thus permitting crank 95, rods 150, 154, and catches 180, 181 to return to their normal positions and releasing fingers 70 of switches PS1, PS2, PS5 and PS6.

Referring now more particularly to Figs. 24–27, the interlocking feature of fingers 70 of the various switches referred to above, will be more fully explained. Fig. 26 shows any vertical group of three switches on any one of the switch panels V, X and Z. For purposes of this explanation, let us assume the switch groups shown in Figs. 24–27 are the quarter switches QS1, QS2 and QS3 on panel Z. Each of the micro switches has a spring-loaded protruding shaft 185 and at least two electrical leads 86, 86. The finger 70 for each switch is formed from a piece of stiff wire which is bent to provide an elongated arm portion 70a and a contact portion 70b bent at right angles to portion 70a. The top switch in any group of three or more, is provided with a locking arm 188a which may if desired, be formed from the same piece of wire as finger 70. Arm 188a is non-rotatably secured to shaft 185 in any desired manner and is directed to a position whereby it may be engaged by a portion of the movable structure of the next consecutive switch. In the present case, the arm 188a extends downwardly and terminates in a right-angle length 189. The arm 188b on intermediate switch QS2 has a somewhat modified configuration in order that it may cooperate with the arm 188a to hold it in a closed or locked position. Arm 188b has a substantially horizontal length 190, and from thence extends downwardly at 191 substantially at right angles to length 190 to terminate in a cross-arm 192 positioned normally above shaft 185 of switch QS3. The arm 188c on bottom switch QS3 has a length 193 which terminates in a downwardly extending length 194. It will be understood that the intermediate arm 188b combines features which cooperate with both an upper and a lower switch. Since arm 188a is the uppermost of a series, it is only necessary to supply an arm which cooperates with a lower switch and conversely, arm 188c may be modified to include only portions which would cooperate with an upper switch. Naturally, all of the arms could be made in the form of 188b if desired, and any number of intermediate switches with arms having the shape of 188b, may be included.

Figure 24:
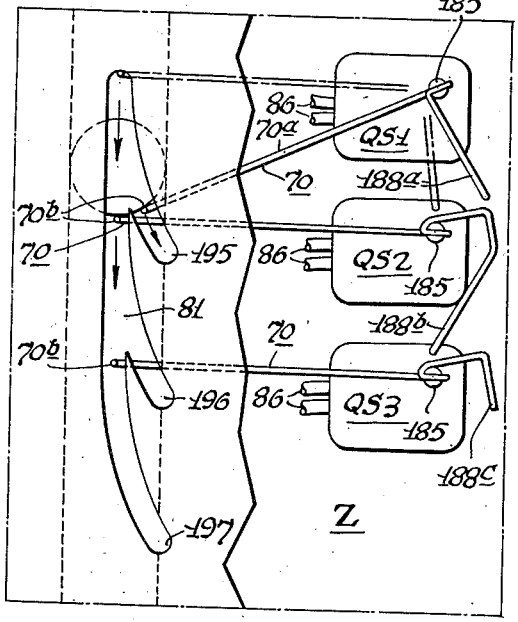
Figs. 24 and 25 are enlarged fragmentary details showing the operation of the interconnected switches in one of the coin chutes.
Figure 25:
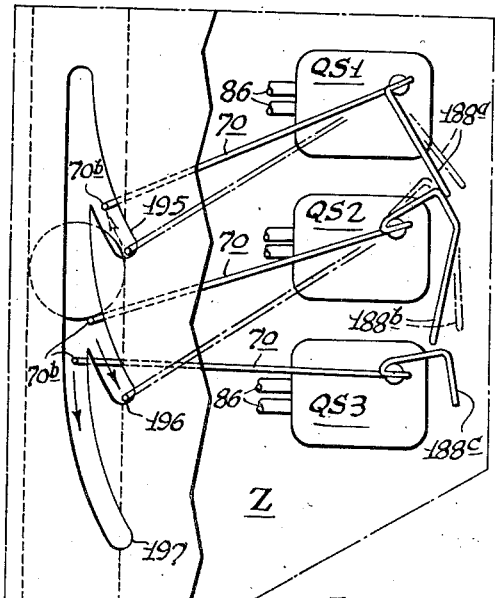

Fig. 24 shows the pivoting of the first or top switch in any group when a coin drops through a chute. The coin retains the finger portion 70b in the recess 195 until the next succeeding finger has been depressed at least an amount sufficient to engage the vertical length 191 on the intermediate finger behind cross arm 189 of the first switch. Extension 70b of the second switch QS2 continues to pivot downwardly until it is forced into recess 196 by the coin. During this time however, the coin has passed from contact with the extension 70b of switch QS1 but the switch is held through arms 188a and 188b (shown in Fig. 25). The same procedure is repeated for switch QS3 which serves to hold both of the preceding switches in a locked position so long as the finger of the lowermost switch is pivoted.

A particular advantage of this arrangement resides in the fact that the weight of the coin is the only actuating force for operating the switches. Since the switches are spring-loaded so that they automatically return to their initial positions, it is therefore necessary that the weight of a dime be sufficient to pivot the switch fingers. By employing a relatively long finger and also arranging the switches so that only one switch must be thrown at a time, I encounter no difficulty whatsoever in sequentially closing and locking as many switches as may be desired. The clearances and positioning of the fingers with respect to the chutes and recesses 195, 196 and 197 is such that there is sufficient over-travel to insure the engagement of all of the locking arms 188a, 188b and 188c. This interlocking feature is also of importance since it provides foolproof operation as well as an unlimited range of circuits which may be controlled by any one coin because the chutes may be as long or as short as may be required to provide space for the necessary switches.

The nickel unit consisting of nickel switch panel X and the nickel chute panel W, will be more particularly described in conjunction with Figs. 4 and 34 (Sheets 2 and 10). The chute assembly W has a front face 205 and a rear face 206 which enclose therebetween a first vertical chute 207, a second chute 208, a third chute 209, a fourth chute 210, and a fifth chute 211. The slots 74–78 for the nickel switch fingers are in vertical alignment with chutes 207–211 and the top of each chute 207–210 is provided with gates 114c, 114d 114e and 114f in the same manner as described previously in conjunction with the penny chute panel assembly U. Chute 211 does not have a gate. The nickels are fed to the top or mouth of the panel assembly W through the spout 212 of the coin selector S so that the first nickel falls directly into chute 207 whereupon it strikes the foot F of the first gate 114c, causing it to pivot in the faces 205 and 206, thereby effectively closing the top of chute 207. As the first nickel drops downwardly through the chute 207, switch NS1 is closed as its associated gate 114c closes, and switches NS2 and NS3 are likewise closed as the coin drops downwardly through the chute. The finger 70 of the switch NS3 is retained from swinging downward sufficiently to clear chute 207 by means of the release rod 213 which is pivoted on face 205 in brackets 214 and 215. The second nickel deposited in the chute panel W drops into the second chute 208 in the same manner described previously in conjunction with panel U and comes to rest at the bottom of the chute on the finger 70 of nickel switch NS7 which is likewise temporarily retained by release rod 213.

Likewise, this sequence is repeated for the third nickel in chute 209 and the fourth nickel in chute 210. The fifth nickel falls into chute 211 without closing any gate since in the present form, chute 211 is the last of the nickel chutes. It will be noted that the fingers on switches NS3, NS7, NS10, NS12 and NS14 retain the nickel in each chute until the release rod is pivoted. In the present case, it so happens that the maximum sales price of the machine is twenty-five cents so that it is not strictly essential that the fingers 70 of switch NS14 be retained by rod 213. If five nickels have been deposited in the machine, any sales price up to twenty-five cents must have been equaled or exceeded so that the fifth nickel would have been permitted to drop directly through chute 211 without any temporary retention. The lag caused by this slight delay is however, so slight as to be of no practical consequence.

Whenever the set price has been reached so that solenoid 94 is energized, trip plate 98 is moved to the right which pivots crank 96 in brackets 217 and 218, thus removing release rod 213 from contact with the switch fingers. This immediately permits the nickels imprisoned in the chutes 207–210 to drop downwardly onto wall 219 from which they roll onto wall 220 and from thence into the funnel 221 for the nickel coin barrel 89. The nickel in chute 207 however, closes switch NS4 after actuation of release rod 213. This switch performs the same function that switch PS4 performs on panel U so that solenoid 94 is not prematurely deenergized. Finger 70 on switch NS4 pivots into recess 222 in chute wall 219 to permit the nickel in chute 207 to clear the lower end of the wall of chute 207. Thus, solenoid 94 has been held for a sufficient length of time to permit the fingers 70 of all the other switches to return to their horizontal positions. As soon as the first nickel begins its travel along wall 219, finger 70 of switch NS4 is released to deenergize solenoid 94 and permit rod 213 to be returned by spring 223.

The dime panel assembly Y (Fig. 36) functions in identically the same manner as has just been described in conjunction with the nickel panel assembly of Fig. 34. Dime switches DS1, DS2 and DS3 are closed and held closed by the first dime which is deposited in the dime panel through the dime spout 225 on selector S. The first dime falls into the dime chute associated with slot 71 and closes gate 114g at the top of this chute. Release rod 226 retains the first and subsequent dimes by arresting the pivotal movement of the fingers 70 of the bottom switches DS3, DS7 and DS10 respectively. Release rod 226 is pivoted in brackets 227 and 228 and is urged into a closed or retaining position by means of a spring 229. Crank 97 pivoted in brackets 231 and 232 serves to actuate the release rod 226 and for this purpose the lower end of the crank is engaged in aperture 233 on the trip plate 98. Switch DS4 is a holding switch for solenoid 94 and functions in the same manner as switches NS4 and PS4 previously described. It will be noted that all the gates 114c—114h for both the nickel and dime chutes are retained by means of their arms 131 which abut and are actuated by the fingers 70 of the top switch for each chute. Likewise, the upper groups of switches for each chute are interlockingly held in a closed position in the same manner as described in conjunction with Figs. 24–27. After the dimes have been released from the chutes, they drop into the funnel 235 of dime barrel 90 (shown in Fig. 36). As in the case of the nickel panel W, the last dime slot 73 and its associated chute does not need a gate, and the finger 70 of switch DS10 may or may not be retained temporarily by the rod 226 since if three dimes have been deposited in the panel, any sales price up through twenty-five cents has of course, been reached.

In the present machine, a quarter is the largest denomination coin adapted for use therein. Therefore, there is no reason to utilize a quarter coin barrel since a quarter is never given in change, and there is no reason for using a gate at the top of the coin chute since no more than one quarter would be inserted in the machine to purchase an article priced from one to twenty-five cents. However, in the event that it is desired to use a half-dollar coin or in the event that higher sales prices will be employed, it is only necessary to enlarge the machine by duplicating the construction of the dime and/or nickel panels for the quarter chute.

As the quarter falls through the spout 236 from selector S, it drops directly into a chute which is in registry with slot 68. In falling through this chute, it closes and interlocks the quarter switches QS1, QS2 and QS3 and also closes switches QS4 and QS5 for a purpose to be described more fully hereinafter. From thence the quarter drops directly into coin box 87.

Referring now more particularly to Fig. 2, each chute panel assembly is provided with a coin barrel for receiving the coins which fall through the chutes after they have been released, as previously described. Penny chute panel U has a coin barrel 88, the nickel chute panel W has a coin barrel 89, and the dime chute panel Y has a dime coin barrel 90. Each of the coin barrels is substantially similar and in fact identical except that the penny barrel 88 is somewhat longer than the nickel barrel 89, and the nickel barrel is in turn longer than the dime barrel 90 because there will be successively fewer coins as the denominations increase.

Referring now to Figs. 28–33, the construction of the penny coin barrel proper will be described in detail and it will be understood that its construction may be somewhat the same as coin barrels 89 and 90 although they will, of course, be of somewhat different diameter to accommodate the other denomination coins.

The tops of the barrels are provided with specially designed funnels 173, 221, 235 (Figs. 28, 34 and 36) which are positioned under their associated chute panels in such a manner that a coin dropping from the panel is directed onto a curved portion 241 of the funnel (Fig. 28). This turns the coin substantially 90° so that it is horizontal as it passes over the top of the barrel. If the barrel is not full, the coin falls into the barrel and the same procedure is repeated until the barrel is filled, as shown in Fig. 28. In this event however, subsequent pennies dropping from panel U slide completely across the uppermost coin in the barrel and from thence fall into the mouth 242 of chute 342, and from thence the coins fall into the coin box 87 at the bottom of case 50.

The ejecting mechanism for the barrel comprises a stripper plate 245 which is pivoted between aligning plates 246 and 247 by means of a bolt and nut 248. The stripper plate 245 is spring-loaded by means of helical tension spring 249 anchored on bracket 250, and is actuated by means of a solenoid 91 and link 252 secured to the armature of the solenoid. Stripper plate 245 has an aperture 253 which is partially surrounded by a collar 254 so that the aperture 253 in the closed position of Fig. 30 is in alignment with the bore of barrel 88, and in the open position of Fig. 31 is in alignment with the edge 255 of lower plate 247. The height of collar 254 in the present form is substantially equal to the thickness of four pennies and in any event this height must be equivalent to the maximum number of coins to be ejected from the barrel at one time. Any number less than this maximum may be ejected by means of the adjustable stop 256 for the bottom of the barrel. Stop 256 is mounted on an angle bracket 257 vertically slidable on angle bracket 258 between guides 259, 259. In the lowermost position shown in Fig. 28, the top of the stop 256 is flush with the upper face of plate 247 so that there is ample space for four coins to drop from barrel 88 onto stop 256. In this event, energization of solenoid 91 pivots stripper plate 245 to remove the bottom four coins and permit them to fall away from the support of plate 247 when the plate 245 nears its maximum position (shown in Fig. 31). The remaining upper surface of the stripper plate prevents further coins from dropping from the barrel until the plate has been returned by spring 249 to its initial position in which the aperture 253 registers with the bore of barrel 88. As soon as this occurs, the coins in the barrel drop down until the lowermost coin hits the upper face of stop 256, whereupon the operation may be repeated. In the event it is desired to eject less than the maximum number of coins simultaneously, the bracket 257 is moved upwardly in bracket 258, which is accomplished by removing screw 260 and inserting it in the proper registering holes 261 in brackets 258 and 262. The stop 256 is then raised above the upper surface of plate 247 and the curved sides of the stop clear the cutout portion on collar 254 so that the plate 245 performs its function regardless of the elevation of stop 256.

In the present coin changing machine, it is only necessary to provide this adjustment on the penny barrel 88. It will be understood however, that a similar arrangement may be used in conjunction with any of the coin barrels. Likewise, only the penny barrel 88 is provided with means whereby in the event the number of pennies in the barrel becomes depleted, the mechanism automatically prevents acceptance of further coins so that no customer can be short-changed. For this purpose, the side of the barrel 88 is provided with a slot 265 in which a finger 266 is positioned to ride against the edges of any coins in the barrel. The contact point 267 of finger 266 is located at any predetermined height from the barrel so that when the coins in the barrel drop below this point, finger 266 pivots to the left (as seen in Fig. 28), thereby closing a switch 268 which is electrically connected to the selector S. When switch 268 closes, the coin selector S directs all of the coins into the coin return 52 instead of into spouts 225, 236, 212 and 269.

Fig. 44 (Sheet 6) illustrates an additional or alternative device for maintaining the supply of penies which may be required to give change. Since in many cases it is not feasible to increase the length of the penny coin barrel 88 due to size limitations of the cabinet, I can also use two penny barrels 88a and 88b. A bifurcated chute 270 may be arranged to receive all or most of the pennies after they have been released from the various chutes in penny chute panel U. The lower portion of chute 270 is divided so that one channel 270a leads to barrel 88a and the other channel 270b leads to penny barrel 88b. The pennies are alternately directed into barrels 88a and 88b by means of a freely pivoting gate 271 which is mounted on shaft 272 on the centerline of chute 270. Gate 271 has opposite concave quadrantal faces 273 and 274 of substantially the same radius as the coins with which it is to be used, in this case pennies. When the first coin C1 strikes gate 271, one of the faces 273 or 274 will be directed upwardly so that the coin drops into the face and is thereby guided into the adjacent chute as it pivots the gate around shaft 272. A stop 275 arrests further pivotal movement of the gate and when the gate contacts stop 275, the coin C1 falls by gravity from the face (in the present example face 273) in which it has dropped. This position of the gate automatically pivots the the opposite face 274 to an upward position so that the following coin C2 strikes face 274. The above pivoting action is repeated in the opposite direction so that the coin C2 is directed to the other barrel 88a through chute 270a.

It will be understood that the barrel-filling mechanism of Fig. 44 may be incorporated in any of the chute panels but it is particularly adapted for use with the modified form of Fig. 41, to be described more fully hereinafter. In addition, the use of two coin barrels on the penny panel enables a single stripper plate to move simultaneously two pennies from each barrel in order to deliver four cents in change. Since many articles dispensed in machines of this sort sell for one cent or six cents, the necessity for delivering four cents in change occurs most frequently.

Figs. 37–39 show the coin stripping mechanism used on nickel and dime barrels 89 and 90 and it will be understood that this mechanism is essentially similar to that used on the penny barrel 88 except that only one coin may be dispensed at a time. A stripper plate 280 is pivotally mounted between the bottom face 281 and a retaining plate 282 of the coin barrel. For the purposes of this disclosure, the stripper plate mechanism shown in Figs. 37–39 carries numerals corresponding to the mechanism associated with barrel 89 for the nickels. However, it will be understood that the dime barrel mechanism is identical. Stripper plate 280 is pivotally mounted at 283 and is connected to the armature 284 of solenoid 92 by means of a link or rod 285. A single actuation of solenoid 92 serves to withdraw one coin from within the barrel 89 and to deposit it in the funnel 236 which leads to the coin return 52. Stripper plate 280 is spring-loaded by means of a helical spring 287 anchored in bracket 288. Since it is also possible to actuate the stripper plates for the nickel and dime barrels more than once in each cycle, the coin barrel 89 for the nickels is operated by means of solenoid 92 in substantially the same manner that has been described in conjunction with the penny solenoid 91. Fig.

36 shows the coin stripper plate assembly for the dimes. Solenoid 93 is connected to a stripper plate 289 by means of a rod 290 and armature 291. Whenever solenoid 93 is energized, the plate 289 pulls the lowermost coin from barrel 90 and deposits it in funnel 286 in the same manner that has been described previously. If desired, the armatures 284 and 291 of solenoids 92 and 93 may be directly connected to the stripper plates 280 and 289 to provide a linear motion rather than a pivotal motion.

ELECTRICAL CIRCUITS

Referring now more particularly to Fig. 43, the wiring diagram for a sales price of six cents will be described in detail. This diagram is typical and has been chosen because it is especially adapted for soft drink dispensing machines in which the sales price is five cents plus one cent tax. Preliminarily it will be explained that there are six double-throw switches in the circuit as follows: PS1, PS2, PS5, PS6, NS9 and NS11. In tracing the wiring diagram, it will be understood that the lefthand and middle lead of each double-throw switch are normally closed, that is before a coin passes through the chute, whereas the left and right-hand leads are connected when the switch is thrown. In Fig. 43, the leads for all the double-throw switches have been indicated even though all are not used in this circuit.

Any one of the gates for the intermediate chutes 107—111 may be selectively retained closed by disconnecting its associated hair spring. In the present example, I have selected gate 115a so that the first penny drops directly into chute 106 whereas the second penny passes over chute 107 and drops into chute 108, closing gate 115b. Assuming now that the purchaser uses six pennies rather than one penny and some other coin, the first penny (as noted above) falls into chute 106 and successively closes switches PS1, PS2 and PS3. The second, third, fourth and fifth pennies drop into chutes 108–111 closing their associated gates in succession. The sixth penny is directed into chute 112 by gate 114b, thus closing switches PS5, PS6 and PS7. However, as soon as switch PS5 is closed, solenoid 94 is energized so that all of the pennies in the penny chute panel are dropped into the coin barrel 88. Since there is no necessity for returning any change, no circuit is closed to energize any of the return solenoids 91, 92 or 93. Whenever solenoid 94 is energized, switch 163 is closed to actuate the dispensing mechanism.

Let us now assume that the customer instead of inserting six pennies, intends to use a penny and some other coin. He then of course, has the choice of inserting the other coin first, or the penny first. In the case that he elects to use a penny and a dime or a penny and a quarter, it is important which coin he inserts first since if he inserts either the dime or the quarter first, the six cent sale price will have been exceeded. However, it is immaterial whether he inserts a nickel first and then a penny, or a penny first and then a nickel. In the present case let us assume that the penny is first inserted. In this event, the penny drops into chute 106 and throws switches PS1 and PS2 to connect the outermost leads on each switch and to close switch PS3. This however, merely conditions a circuit since no solenoid is energized. The purchaser then has a choice of inserting either a nickel, a dime, or a quarter. If he inserts a nickel, switch NS1 is closed which completes the circuit to solenoid 94 through the right and left-hand leads of switch PS3, releasing the coins and actuating the dispensing device. Solenoid 94 is held through switch NS4 until all of the switch wires 70 have an opportunity to return to their initial positions. It will be understood that switch NS4 cannot be actuated until solenoid 94 is energized because release rod 213 is above switch NS4.

Now, let us assume that instead of a nickel, the purchaser uses a dime after the first penny. The dime closes switch DS1 which completes a circuit through the right and left-hand leads of switch PS2 to energize solenoid 92, thus returning a nickel in change. Likewise, the closing of switch DS2 completes the circuit to solenoid 94 for the actuating of the dispensing and coin release mechanism. Switch DS4 holds solenoid 94 in the same way that has been described in conjunction with switch NS4.

Now let us assume that instead of either a nickel or a dime, the purchaser inserts a quarter after the first penny. In this event, the quarter falls directly through into the coin box 87 but during its fall, it has closed successively switches QS1, QS2, QS3, QS4 and QS5. When switch QS3 is closed, a circuit is completed through the right and left-hand leads of switch PS1 to energize solenoid 93, thus returning one dime in change. Although switches QS1 and QS2 are closed, no circuit is completed since the middle lead to switch PS1 is open. Switch QS4 however, closes the circuit to solenoid 94 for the coin release and dispensing device, and switch QS5 closes the circuit to solenoid 93 a second time which returns the second dime, making a total change of twenty cents.

Let us now assume that the purchaser uses two nickels only. The first nickel closes switches NS1, NS2 and NS3 but no circuit is completed since switch PS3 is open and switches NS2 and NS3 are not connected. The second nickel however, closes switch NS5 which energizes penny solenoid 91 to return four cents in change, since it is assumed that the stripper mechanism for the penny coin barrel is set to return four pennies as would be the case for a six cent sale. The second nickel also closes switch NS6 which completes the circuit to solenoid 94 to actuate the dispensing mechanism. In this case, the first nickel holds switch NS4 as previously described.

Now let us assume that only one dime is used. The dime closes switches DS1, DS2 and DS3. Switch DS1 completes the circuit to penny solenoid 91 through the middle and left-hand leads of switch PS2 since this switch has not been thrown by a penny. Closing of switch DS2 energizes solenoid 94 for the dispensing operation. Switch DS3 is not connected and switch DS4 holds solenoid 94 as noted.

Let us assume now that only a quarter is used. As the quarter falls directly through its chute, it closes all five quarter switches QS1–QS5. When switch QS3 is closed, a first circuit will be completed to solenoid 92 through the left-hand and middle leads of switch PS1 (which is not thrown because there is no penny in chute 106) and through switch QS1; this returns one nickel. Likewise, a circuit is closed through switches PS1 and QS2 to energize penny solenoid 91 which returns four pennies. Closing of switch QS4 actuates the dispensing mechanism, and closing of switch QS5 energizes solenoid 93 to return a dime, thus making a total of nineteen cents in change.

It will thus be understood that with the six cent setting, any combination of coins from a penny to a quarter may be used to obtain the merchandise and to return the correct change. The possible combinations and number of switches that may be employed can, of course, be varied to produce whatever result may be desired under any circumstances. For example, it is not essential that separate switches be used in all cases. The three top quarter, dime and nickel switches in each chute can be double or triple-pole switches rather than single-pole switches and the sequence with which the switches are operated may also be varied, depending upon the result desired.

It should be noted again, that if the purchaser in buying a six cent article wants to obtain a nickel in change, either by putting in a quarter and a penny or a dime and a penny, he must put the penny in first since otherwise the sales price has been reached as soon as the dime or quarter is inserted in the machine.

It is believed that the above detailed description of the setting and wiring diagram of the machine in conjunction with the sale of a six cent item, is ample to illustrate how the machine may be adjusted for dispensing at any predetermined sales price and also it may be designed to use half-dollar pieces in addition to or in place of the other denominations. However, in order that the disclosure be sufficiently complete, I have tabulated the connections for any other sales price from one to twenty-five cents and by referring to Fig. 43, it will be apparent how the switches are connected for each value.

One cent

Close gates 115a–115e and 114b.

Connect only the following switches: QS1 to the hot side 292 of the power line and to solenoid 91; QS2 to line 292 and solenoid 93; QS4 to line 292 and solenoid 94; QS5 to line 292 and solenoid 93; DS1 to line 292 and solenoid 92; DS2 to line 292 and solenoid 91; DS3 to line 292 and solenoid 94; DS4 to line 292 and solenoid 94; NS2 to line 292 and solenoid 91; NS3 to line 292 and solenoid 94; NS4 to line 292 and solenoid 94; PS3 to line 292 and solenoid 94; PS4 to line 292 and solenoid 94.

The penny barrel stripper plate is set for four pennies.

The single coin or combinations thereof operative in this diagram are:

> One penny
> One nickel
> One dime
> One quarter

In the event the purchaser inserts two pennies when the machine is set for a one cent sale, the second penny will strike closed gate 114a and roll over all of the following gates to drop into chute 113 which connects with the coin return box. However, unless the second penny immediately follows the first penny, gate 114a will reopen and the machine will dispense a second item.

The four holding switches QS4, DS4, NS4 and PS4 are connected exactly as shown in Fig. 43 and as described above, in each circuit so that it is considered unnecessary to repeat the connections for these four switches hereinafter.

Two cents

Close gates 115a–115e, open gates 114a and 114b.

The switch connections are the same as described for the one cent circuits except that switch PS7 is connected to line 292 and solenoid 94.

The penny barrel stripper plate is set for three pennies.

Three cents

Close any four gates 115a–115e; open gates 114a and 114b.

The switch connections are the same as described for two cents.

The penny barrel stripper plate is set for two pennies.

Four cents

Close any three gates 115a–115e; open gates 114a and 114b.

The switch connections are the same as described for two cents.

The penny barrel stripper plate is set for one penny.

Five cents

Close any two gates 115a–115e; open gates 114a and 114b.

Connect only the following switches: QS1 to line 292 and solenoid 93; QS5 to line 292 and solenoid 93; DS1 to line 292 and solenoid 92; DS2 to line 292 and solenoid 94; NS3 to line 292 and solenoid 94; PS3 to line 292 and PS7; PS7 to PS3 and solenoid 94.

The penny stripper plate setting is immaterial since the penny solenoid 91 is not connected.

The single coins operative in this diagram are:

> Five pennies
> One nickel
> One dime
> One quarter

Seven cents

All gates are open.

Connect only the following switches: QS1 to (QS2, middle lead of PS5) and solenoid 92; QS2 to (QS1, middle lead of PS5) and solenoid 91; QS3 to line 292 and left-hand lead of PS5; QS5 to line 292 and solenoid 93; DS1 to line 292 and left-hand lead of PS6; DS2 to line 292 and solenoid 94; NS1 to line 292 and PS7; NS5 to line 292 and solenoid 91; NS6 to line 292 and solenoid 94; PS5 left-hand lead to QS3, middle lead to both QS1 and QS2, right-hand lead to solenoid 93; PS6 left-hand lead to DS1, middle lead to solenoid 91, right-hand lead to solenoid 92; PS7 to NS1 and solenoid 94.

The penny stripper plate is set for three pennies.

The single coin or combinations thereof operative in this diagram are:

> One nickel and two pennies
> Two nickels
> Two pennies and one dime
> One dime
> Two pennies and a quarter
> One quarter

Eight cents

Close any four gates 115a–115e; open gates 114a and 114b.

The switch connections are the same as described for seven cents.

The penny stripper plate is set for two cents.

Nine cents

Close any three gates 115a–115e; open gates 114a and 114b.

The switch connections are the same as described for seven cents.

The penny stripper plate is set for one cent.

Ten cents

Close any two gates 115a–115e; open gates 114a and 114b.

Connect only the following switches: QS1 to line 292 and solenoid 92; QS5 to line 292 and solenoid 93; DS1 to line 292 and solenoid 94; NS1 to line 292 and left-hand lead of PS5; NS5 to line 292 and solenoid 94; PS5 left-hand lead to NS1 and right-hand lead to solenoid 94.

The penny stripper plate setting is immaterial since no pennies are given in change and the penny solenoid 91 is therefore disconnected.

The single coin or combinations thereof operative in this diagram are:

> One nickel and five pennies
> Two nickels
> One dime
> One quarter

Eleven cents

Close any gate 115a–115e; open gates 114a and 114b.

Connect only the following switches: QS1 to middle lead of PS1 and solenoid 91; QS2 to line 292 and left-hand lead of PS1; QS5 to line 292 and solenoid 93; DS1 to line 292 and switch NS1; DS2 to line 292 and NS2; DS3 to line 292 and left-hand lead of PS2; DS5 to line 292 and solenoid 92; DS6 to line 292 and solenoid 91; DS7 to line 292 and solenoid 94; NS1 to DS1 and solenoid 91; NS2 to DS2 and solenoid 94; NS3 to line 292 and left-hand lead of PS5; NS5 to line 292 and PS3; NS8 to line 292 and solenoid 91; NS9 left-hand lead to line 292 and right-hand lead to solenoid 94; PS1 left-hand lead to QS2, middle lead to QS1, right-hand lead to solenoid 92; PS2 left-hand lead to DS3, right-hand lead to solenoid 94; PS3 to NS5 and solenoid 94; PS5 left-hand lead to NS3, right-hand lead to solenoid 94.

The penny stripper plate is set for four cents.

The single coin or combinations thereof operative in this diagram are:

One nickel and six pennies
    Two nickels and one penny
    Three nickels
    One dime and one penny
    One dime and one nickel
    Two dimes
    One penny and one quarter
    One quarter

*Twelve cents*

Close all gates 115a–115e; open gates 114a and 114b.

Connect only the following switches: QS1 to solenoid 91 and middle lead of PS5; QS2 to line 292 and left-hand lead of PS5; QS5 to line 292 and solenoid 93; DS1 to line 292 and NS1; DS2 to line 292 and NS2; DS3 to line 292 and left-hand lead of PS6; DS5 to line 292 and solenoid 92; DS6 to line 292 and solenoid 91; DS7 to line 292 and solenoid 94; NS1 to DS1 and solenoid 91; NS2 to DS2 and solenoid 94; NS5 to line 292 and PS7; NS8 to line 292 and solenoid 91; NS9 left-hand lead to line 292, right-hand lead to solenoid 94; PS5 left-hand lead to QS2, middle lead to QS1, right-hand lead to solenoid 92; PS6 to left-hand lead to DS3 and right-hand lead to solenoid 94; PS7 to NS5 and solenoid 94.

The penny stripper plate is set for three cents.

The single coin or combinations thereof operative in this diagram are:

Two nickels and two pennies
    Three nickels
    One dime and two pennies
    One dime and a nickel
    Two dimes
    One quarter
    Two pennies and one quarter

*Thirteen cents*

Close any four gates 115a–115e; open gates 114a and 114b.

The switch connections are the same as described for twelve cents.

The penny stripper plate is set for two cents.

*Fourteen cents*

Close any three gates 115a–115e; open gates 114a and 114b.

The switch connections are the same as described for twelve cents.

The penny stripper plate is set for one cent.

*Fifteen cents*

Close any two gates 115a–115e; open gates 114a and 114b.

Connect only the following switches: QS5 to line 292 and solenoid 93; DS1 to line 292 and NS1; DS2 to line 292 and (NS5, left-hand lead of PS5); DS5 to line 292 and solenoid 92; DS6 to line 292 and solenoid 94; NS1 to DS1 and solenoid 94; NS5 to line 292 and (DS2, left-hand lead of PS5); NS8 to line 292 and solenoid 94; PS5 left-hand lead to (DS2, NS5) and right-hand lead to solenoid 94.

The penny stripper plate setting is immaterial since the penny solenoid 91 is disconnected.

The single coin or combinations thereof operative in this diagram are:

Two nickels and five pennies
    Three nickels
    One dime and five pennies
    One dime and one nickel
    Two dimes
    One quarter

*Sixteen cents*

Close any gate 115a–115e; open gates 114a and 114b.

Connect only the following switches: QS1 to line 292 and left-hand lead of PS1; QS2 (middle lead of PS1, QS3) and solenoid 91; QS3 to (middle lead of PS1, QS2) and solenoid 92; DS1 to line 292 and NS5; DS2 to line 292 and (NS1, NS6); DS3 to line 292 and (left-hand lead of PS5, NS7); DS5 to line 292 and left-hand lead of PS2; DS6 to line 292 and solenoid 94; NS1 to (DS2, NS6) and left-hand lead of NS9; NS5 to DS1 and solenoid 91; NS6 to (DS2, NS1) and solenoid 94; NS7 to line 292 and (left-hand lead of PS5, DS3); NS9 left-hand lead to NS1 and middle lead to (PS3, NS10); NS10 to line 292 and (PS3, middle lead NS9); NS11 left-hand lead to line 292 and right-hand lead to solenoid 91; NS12 to line 292 and solenoid 94; PS1 left-hand lead to QS1, middle lead to (QS2, QS3) right-hand lead to solenoid 93; PS2 left-hand lead to DS5, middle lead to solenoid 91, right-hand lead to solenoid 92; PS3 to (middle lead of NS9, NS10) and solenoid 94; PS5 left-hand lead to (DS3, NS7) right-hand lead to solenoid 94.

The penny stripper plate is set for four pennies.

The single coin or combinations thereof operative in this diagram are:

Two nickels and six pennies
    Three nickels and one penny
    Four nickels
    One dime and six pennies
    One dime, one nickel and one penny
    One dime and two nickels
    Two dimes
    One penny and two dimes
    One penny and a quarter
    One quarter

*Seventeen cents*

Close all gates 115a–115e; open gates 114a and 114b.

Connect only the following switches: QS1 to line 292 and left-hand lead of PS6; QS2 to (middle lead of PS6, QS3) and solenoid 91; QS3 to (QS2, middle lead of PS6) and solenoid 92; DS1 to line 292 and (NS5, NS6); DS3 to line 292 and NS3; DS5 to line 292 and left-hand lead of PS5; DS7 to line 292 and solenoid 94; NS3 to DS3 and (PS7, NS10); NS5 to (DS1, NS6) and left-hand lead of NS9; NS6 to (DS1, NS5) and solenoid 94; NS9 left-hand lead to NS5 and middle lead to solenoid 91; NS10 to line 292 and (PS7, NS3); NS11 left-hand lead to line 292, right-hand lead to solenoid 91; NS12 to line 292 and solenoid 94; PS5 left-hand lead to DS5, middle lead to solenoid 91, right-hand lead to solenoid 92; PS6 left-hand lead to QS1, middle lead to (QS2, QS3) and right-hand lead to solenoid 93; PS7 to (NS3, NS10) and solenoid 94.

The penny stripper plate is set for three cents.

The single coin or combinations thereof operative in this diagram are:

Three nickels and two pennies
    Four nickels
    One dime, one nickel and two pennies
    One dime and two nickels
    Two dimes
    Two pennies and two dimes
    One quarter
    Two pennies and one quarter

Eighteen cents

Close any four gates 115a–115e; open gates 114a and 114b.

The switch connections are the same as described for seventeen cents.

The penny stripper plate is set for two cents.

Nineteen cents

Close any three gates 115a–115e; open gates 114a and 114b.

The switch connections are the same as described for seventeen cents.

The penny stripper plate is set for one cent.

Twenty cents

Close any two gates 115a–115e; open gates 114a and 114b.

Connect only the following switches: QS1 to line 292 and solenoid 92; DS2 to line 292 and NS7; DS3 to line 292 and NS3; DS7 to line 292 and solenoid 94; NS3 to DS3 and (PS7, NS10); NS7 to DS2 and solenoid 94; NS10 to line 292 and (PS7, NS3); NS12 to line 292 and solenoid 94; PS7 to (NS3, NS10) and solenoid 94.

The penny stripper plate setting is immaterial since penny solenoid 91 is not connected.

The single coil or combinations thereof operative in this diagram are:

Three nickels and five pennies
    Four nickels
    One dime, one nickel and five pennies
    One dime and two nickels
    Two dimes
    One quarter

Twenty-one cents

Close any gate 115a–115e; open gates 114a and 114b.

Connect only the following switches: QS1 to line 292 and left-hand lead of PS1; DS1 to line 292 and (NS8, left-hand lead NS9); DS2 to line 292 and NS7; DS3 to line 292 and NS3; DS5 to line 292 and NS1; DS6 to line 292 and NS2; DS7 to line 292 and (PS3, NS12, NS7); DS8 to line 292 and solenoid 92; DS9 to line 292 and solenoid 91; DS10 to line 292 and solenoid 94; NS1 to DS5 and solenoid 91; NS2 to DS6 and solenoid 94; NS3 to DS3 and (NS10, PS7); NS7 to DS2 and (PS3, DS7, NS12); NS8 to left-hand lead (NS9, DS1) and left-hand lead NS11; NS9 left-hand lead to (NS8, DS1) and right-hand lead to solenoid 94; NS10 to line 292 and (PS7, NS3); NS11 left-hand lead to NS8, middle lead to left-hand lead of PS2; NS12 to line 292 and (PS3, NS7, DS7); NS13 to line 292 and solenoid 91; NS14 to line 292 and solenoid 94; PS1 left-hand lead to QS1, middle lead to solenoid 91, right-hand lead to solenoid 92; PS2 left-hand lead to middle lead of NS11, middle lead to solenoid 91; PS3 to (DS7, NS7 and NS12) and solenoid 94; PS7 to (NS3, NS10) and solenoid 94.

The penny stripper plate is set for four cents.

The single coil or combinations thereof operative in this diagram are:

Three nickels and six pennies
    Four nickels and one penny
    Five nickels
    One dime, one nickel and six pennies
    One dime, two nickels and one penny
    One dime and three nickels
    Two dimes and one penny
    Two dimes and one nickel
    Three dimes
    One penny and one quarter
    One quarter

Twenty-two cents

Close all gates 115a–115e; open gates 114a and 114b.

Connect only the following switches: QS1 to line 292 and left-hand lead of PS5; DS1 to line 292 and (left-hand lead NS9, NS10); DS3 to line 292 and NS7; DS5 to line 292 and NS1; DS6 to line 292 and NS2; DS7 to line 292 and (NS7, NS12 and PS7); DS8 to line 292 and solenoid 91; DS9 to line 292 and solenoid 92; DS10 to line 292 and solenoid 94; NS1 to DS5 and solenoid 91; NS2 to DS6 and solenoid 94; NS7 to DS3 and (DS7, NS12, PS7); NS9 left-hand lead to (DS1, NS10) right-hand lead to left-hand lead of NS11; NS10 to (left-hand lead of NS9, DS1) and solenoid 94; NS11 left-hand lead to right-hand lead of NS9, and middle lead to solenoid 91; NS12 to line 292 and (DS7, NS7, PS7); NS13 to line 292 and solenoid 91; NS14 to line 292 and solenoid 94; PS5 left-hand lead to QS1, middle lead to solenoid 91, right-hand lead to solenoid 92; PS7 to (DS7, NS7, NS12) and solenoid 94.

The penny stripper plate is set for three cents.

The single coin or combinations thereof operative in this diagram are:

Four nickels and two pennies
    Five nickels
    One dime, two nickels and two pennies
    One dime and three nickels
    Two dimes and two pennies
    Two dimes and one nickel
    Three dimes
    One quarter
    Two pennies and one quarter

Twenty-three cents

Close any four gates 115a–115e; open gates 114a and 114b.

The switch connections are the same as described for twenty-two cents.

The penny stripper plate is set for two cents.

Twenty-four cents

Close any three gates 115a–115e; open gates 114a and 114b.

The switch connections are the same as described for twenty-two cents.

The penny stripper plate is set for one cent.

Twenty-five cents

Close any two gates 115a–115e; open gates 114a and 114b.

Connect only the following switches: DS2 to line 292 and NS10; DS3 to line 292 and NS7; DS6 to line 292 and NS3; DS7 to line 292 and (PS7, NS7, NS12); DS9 to line 292 and solenoid 92; DS10 to line 292 and solenoid 94; NS3 to DS6 and solenoid 94; NS7 to DS3 and (PS7, NS12, DS7); NS10 to DS2 and solenoid 94; NS12 to line 292 and (PS7, NS7, DS7); NS14 to line 292 and solenoid 94; PS7 to (DS7, NS7, NS12) and solenoid 94.

The penny stripper plate setting is immaterial since penny solenoid 91 is not connected.

The single coin or combinations thereof operative in this diagram are:

Four nickels and five pennies
    Five nickels
    One dime, two nickels and five pennies
    One dime and three nickels
    Two dimes and five pennies
    Two dimes and a nickel
    Three dimes
    One quarter In the above description of the circuits for one to twenty-five cent settings, the parenthesis after a switch connection indicates that the same sides of the switches within the parenthesis are all connected together.

Again it must be emphasized that the above enumerated wiring connections are intended to be illustrative only since the switches may be arranged and interconnected with the solenoids in any way that the desired result may be obtained. It is believed that it will be evident to those skilled in the art how to connect the switches to achieve the result desired and also how to increase or decrease the number of switches and the chutes, in accordance with the range expected from any device. Naturally, if it is not necessary to be able to connect any single assembly to handle more than one price, the switches not needed for that particular price may be eliminated. Likewise, it will be entirely possible to have the connections between the switches arranged so that they may be changed either from within or without the case 50. Thus, if the machine is used at a counter where articles having different prices are sold, the customer may set the machine for the sales price of the article and then insert whatever combination of coins he chooses.

The use of double-throw switches which are normally closed in either position, is an important feature of my machine. These double-throw switches are connected in the circuits to energize certain change-return solenoids by alternative conditioning of particular sub-circuits. For example, suppose the purchaser has one penny and one dime, and the machine is set for a six cent sale. The left-hand and middle contacts of switch PS2 are normally closed to condition a circuit to the penny solenoid 91. Therefore, if the dime is first inserted into the machine, the closing of switch DS1 completes the circuit to solenoid 91 to return pennies. However, if the penny is first inserted, switch PS2 is thrown and locked, thus closing the left and right-hand leads to de-condition the circuit to solenoid 91 and to condition the circuit to solenoid 92. Now when switch DS1 is closed by the dime, solenoid 92 is energized to return a nickel.

In the event that the available space in the case 50 does not permit using a plurality of vertical chutes arranged side-by-side, especially for the penny panel, I can obtain a similar result by holding a group of coins in series rather than in parallel. Fig. 41 illustrates such an arrangement applied to the penny chute panel U, in which the mouth 300 opens into a single chute 301 which is divided into a primary offset chute 302 and a secondary slightly offset chute 303. A bottom wall 304 for chute 302 has an upwardly extending lip 305 which is positioned to intercept all the coins falling through chute 301 and to direct them into primary chute 302. The length of primary chute 302 is dependent upon the number of coins for which the sales price is set. In the present instance, I have shown a chute length adapted to a sales price of six cents. As the coins are intercepted by lip 305, they roll downwardly along primary chute 302 and then drop into chutes 306 where the first coin engages a master finger 307 and depresses the finger until the extension 308 of the finger strikes release rod 309 which is pivoted in brackets 310 and 311. Subsequent coins are likewise directed into chute 302 by lip 305 but they back up until the fifth coin rests in the position shown in Fig. 41 which is partially under chute 301. Thus, the fifth coin serves as a gate to direct the sixth coin to secondary chute 303, there being just sufficient clearance between the fifth coin and the upper diagonal wall 312 of chute 303 for this purpose. As the sixth coin falls through secondary chute 303, it strikes master finger 313 and depresses finger 313 into recess 314 in the vertical chute wall 315, whereupon the sixth penny drops directly into the coin box 87. It will be understood that the first coin therefore, actuates the first master finger, and the last coin of any predetermined group of coins actuates the secondary finger 313. This switch actuation by the first and last coins of any group corresponds exactly to the method of switch actuation in penny switch panel U previously described, so that when master finger 313 is depressed to close all of the switches PS5, PS6, and PS7, solenoid 94 is energized in the same manner. It will be apparent that the length of primary chute 302 as well as the vertical distance between rod 309 and the position of the fifth or next-to-last coin, must be calculated so that the next-to-last coin effectively blocks primary chute 302, yet at the same time provides sufficient clearance for the last coin to fall into secondary chute 303.

It will be noted that instead of individual fingers 70 for the switches of Fig. 41, I employ the master finger which is interconnected to the individual switch fingers 316 and 317 by means of a suitable link 318 (Fig. 42). Naturally, the master finger may be the main finger for the middle switch or any one of the others. Switches PS1, PS2 and PS3 are similarly controlled. The disadvantage of using a master finger resides in the fact that the weight of the coins resting on the master finger must be sufficient to actuate three or more switches simultaneously rather than one at a time. Since there will usually be more than one coin in chutes 302 and 306, this does not ordinarily present a problem with respect to switches PS1, PS2 and PS3. However, it is important that the weight of the last coin be sufficient to overcome the spring-loading of all three switches PS5, PS6 and PS7 in the event that a master finger is used in chute 303. Otherwise, the individual fingers of Figs. 26 and 27 should be employed.

Release rod 309 is displaced by crank 95a and is under the tension of a spring 319 as previously described. Fig. 41 does not show switch PS4, in the interest of clarity, but it will be understood that this switch and its associated finger would be located beneath rod 309 if required.

Heretofore, the relatively wide variation in the thickness of coins and especially dimes, has presented serious problems in connection with the stripper plate assembly for coin dispensing barrels. While the same problem theoretically applies with regard to any coin, the minimum thickness of a dime renders the stripping apparatus for use with this denomination more critical than with other denominations.

Figs. 45-52 illustrate in detail a modified stripper assembly which may be advantageously applied to any coin barrel and particularly to the dime barrel. The coin barrel 325 is provided with a lower supporting plate 326 to which it is rigidly secured by welding or brazing. An angle bracket 327 supports the coin barrel 325 as well as the stripper plate 328 by means of bolts 329, 329 and the bracket 327 is secured to solenoid bracket 330 by screws 331. Bracket 327 is provided with an arcuate aperture 332 (Fig. 47) which extends substantially halfway under the bore of barrel 325. The bottom edge 333 of aperture 332 is slightly beveled (shown in Fig. 49) to avoid any possibility that a coin withdrawn by stripper plate 328 be caught on the arcuate edge 332. The stripper plate 328 is provided with an elongated aperture 334 of substantially greater width than the base of the coin barrel 325. I have found that it is desirable to rigidly attach the stripper plate 328 to the solenoid 335 of solenoid 336 and also to use a helical compression spring 337 in the bore of solenoid 336 for returning solenoid 335 and plate 328. This construction not only reduces the space required but provides a more positive action for the plate. After the coins have been withdrawn from the barrel 325, they may be directed by a deflector 338 through aperture 339 in plate 340 (shown in Fig. 49).

It will be understood that in general, the operation of the stripper plate 328 and the solenoid 336 are similar to the plate and solenoid previously described. However I have found it is important to control the dimensions of the stripper plate and its associated structure within certain limits in order to avoid jamming. The gap between the upper plate 326 and the horizontal portion of bracket 327 should be a few thousandths of an inch greater than the thickness of a new coin (in the present instance, a dime). This assures that the thickest possible coin will always clear the plates. Likewise, the gap between plate 326 and bracket 327 should not be more than a few thousandths of an inch less than twice the thickness of the thinnest possible coin so that it will be impossible for two coins to pass through this gap. Therefore, the thickness of spacer guides 341 and 342 is critical and should be maintained within the above limits for each denomination.

The thickness of the stripper plate is also critical, and the maximum thickness of the plate should be just enough to provide a smooth sliding fit between bracket 327 and plate 326. If the stripper plate is of uniform thickness as shown in Figs. 50 and 52, it is important that the trailing edge of aperture 334 be provided with a bevel or taper 343 which extends from side to side across aperture 334. The thickness of leading edge 344 should be a few thousandths of an inch less than the thickness of the thinnest possible coin. The bevel 343 may be fairly steep and arcuate as shown in Fig. 50, or it may be entirely flat and extend substantially over the trailing surface of plate 328. Such a bevel is shown at 343a in Fig. 52.

A satisfactory alternative stripper plate 328a is shown in Fig. 51. This plate has a uniform thickness a few thousandths of an inch less than the thinnest coin and is provided with one or more ridges 345, 345 on its upper surface to axially position the stripper plate between plate 326 and bracket 327 in such a manner that the under surface of the stripper plate is always in contact with the top surface of bracket 327.

The diameter of the coin barrel 325 may desirably be approximately 1/32" greater than the diameter of a new coin intended to be used in the barrel, and I have found that the displacement of armature 335 and the stripper plate should be approximately one-half the diameter of the barrel.

When solenoid 336 is deenergized, spring 337 urges the stripper plate 328 or 328a to the right as seen in Fig. 45, until the armature abuts the edge of plate 326. In this position, no part of the stripper plate protrudes beneath the bore of barrel 325. As the coins drop into the barrel, the bottom coin falls out of the barrel and into aperture 334 and comes to rest on the protruding upper surface 346 of bracket 327. Subsequent energization of solenoid 336 then draws the stripper plate together with the coin in the aperture 334 of the stripper plate, to the left as shown in the drawing until the coin sufficiently clears the edge 332 to permit it to drop through the aperture in the bracket 327 (shown in Fig. 49). Since the distance between the plate 326 and bracket 327 is never enough to permit two of the thinnest coins to pass therebetween simultaneously, only one coin can be expelled at a time. Furthermore, since the contacting edge 344 of the stripper plate is always less than the thickness of the thinnest possible coin, there is no possibility that the coin will jam even though the second coin from the bottom has partially entered aperture 334. In this event, movement of the stripper plate will push all the coins in the barrel upwardly so that the trailing edge of the stripper plate passes completely under these coins. The same result is achieved in the structure of Fig. 51 but in this event, it is not necessary that the upper coins be moved at all because the thickness of the plate is always less than the thinnest coin.

It will thus be understood that I have described a stripper plate assembly which is capable of handling all denominations of coins regardless of the amount of wear on the coins. The device has proved highly satisfactory even when used with dimes which are worn so thin that the faces are obliterated.

The coin changing machine in its entirety and in specific details is therefore completely foolproof and is capable of being set either permanently or temporarily at any desired sales price. It is also capable of returning the correct change regardless of how the coins required to make up the sales price may be inserted.

Having thus described by invention, I claim:

1. In coin handling apparatus, a coin chute assembly comprising spaced front and rear plates, walls between said spaced plates defining a plurality of chutes through which a coin may freely fall by gravity, said plates having edges therein defining lateral apertures providing access to the interior of at least two of said chutes, at least three pivoting fingers positioned to extend into each of said chutes through said apertures and to be successively intercepted by a coin falling through said chutes, a switch associated with each of said fingers, said switches being successively actuated by movement of said fingers, interlocking members on said switch fingers to hold the fingers in a latched position after actuation of said switches, and a normally open gate at the entrance of each chute operable to be engaged and closed by the entrance of a coin into the chute.

2. In coin handling apparatus, a coin chute assembly comprising spaced front and rear plates, walls between said spaced plates defining a plurality of chutes through which a coin may freely fall by gravity, said plates having edges therein defining lateral apertures providing access to the interior of at least one of said chutes, at least three pivoting fingers positioned to extend into said apertures and to be successively intercepted by a penny falling through said chute, a switch operatively associated with each of said fingers, said switches being successively actuated by movement of said fingers, interlocking members on said switch fingers to hold the fingers in a latched position after actuation of said switches, a gate at the entrance of each chute, a receptacle at the bottom of the spaced plates and positioned to receive coins falling through at least one of the chutes, means for selectively dispensing coins from said receptacle, a solenoid responsive to said switches for actuating said dispensing means, and electrical connections between said switches and said solenoid.

3. In coin handling apparatus, a chute assembly comprising spaced front and rear plates, walls between said spaced plates defining a first chute, walls between said spaced plates defining a last chute, wall between said spaced plates defining a plurality of intermediate chutes, said chutes being substantially vertical and having their upper termini arranged in successively sloping relationship, at least one of said plates having edges therein defining lateral apertures providing access to the interiors of said first and last chutes, at least three pivoting fingers positioned to extend into the apertures in the first chute and to be intercepted by a coin falling through said chute, at least three pivoting fingers positioned to extend into the apertures of said last chute and to be intercepted by a coin passing through said chute, a plurality of switches operatively associated with said fingers, said switches being actuated by movement of said fingers, a gate at the entrance of each chute, a spring operatively associated with each of said fingers to re-position the fingers after displacement by a coin, connecting means between at least one of said gates and a switch finger for opening the gate by means of the finger spring, and interlocking members on said switch fingers operable after actuation of said switches to hold said fingers in a latched position.

4. In coin handling apparatus, a coin chute assembly comprising spaced front and rear plates, walls between said spaced plates defining a plurality of chutes through which a coin may freely fall by gravity, said plates having edges therein defining lateral apertures providing access to the interior of at least two of said chutes, at least three switches mounted adjacent said apertures, finger means extending into the aperture for actuating said switches, interlocking members on said switches to hold them in a latched position, and a normally open gate at the entrance of each chute adapted to be engaged and closed by a coin entering the chute.

5. In coin handling apparatus, a coin chute assembly comprising spaced front and rear plates, walls between said spaced plates defining a first chute, walls between said spaced plates defining a last chute, walls between said spaced plates defining a plurality of intermediate chutes, said chutes being substantially vertical and having their upper termini arranged in successively sloping relationship, at least one of said plates having edges therein defining lateral apertures providing access to the interiors of said first and last chutes, at least three pivoting fingers positioned to extend into the apertures in the first chute and to be intercepted by a coin falling through said chute, at least three pivoting fingers positioned to extend into the apertures of said last chute and to be intercepted by a coin passing through said chute, a plurality of switches operatively associated with said fingers, said switches being actuated by movement of said fingers, a gate at the entrance of each chute, a spring operatively associated with each of said fingers to re-position the fingers after displacement by a coin, connecting means between at least one of said gates and a switch finger for opening the gate by means of the finger spring, interlocking members on said switch fingers operable after actuation of said switches to maintain the same in a latched position, a coin receptacle positioned at the bottom of said spaced plates for receiving coins falling through said chutes, and means including an electric circuit responsive to the switches for dispensing coins selectively from said receptacle.

6. In coin handling apparatus, a coin chute assembly comprising spaced front and rear plates, walls between said spaced plates defining a first chute, walls between said spaced plates defining a last chute, walls between said spaced plates defining a plurality of intermediate chutes, said chutes being substantially vertical and having their upper termini arranged in successively sloping relationship, at least one of said plates having edges therein defining lateral apertures providing access to the interiors of said first and last chutes, at least three pivoting fingers positioned to extend into the apertures in the first chute and to be intercepted by a coin falling through said chute, at least three pivoting fingers positioned to extend into the apertures of said last chute and to be intercepted by a coin passing through said chute, a plurality of switches operatively associated with said fingers, said switches being actuated by movement of said fingers, a gate at the entrance of each chute, a spring operatively associated with each of said fingers to re-position the fingers after displacement by a coin, connecting means between at least one of said gates and a switch finger for opening the gate by means of the finger spring, means for interlocking said switch fingers, a coin receptacle positioned at the bottom of said spaced plates for receiving coins falling through said chutes, means including an electric circuit responsive to the switches for dispensing coins selectively from said receptacle, a coin retainer positioned in said first and last chutes, and means for displacing said coin retainer.

7. In coin handling apparatus, a coin chute assembly comprising spaced front and rear plates, walls between said spaced plates defining a first chute, walls between said spaced plates defining a last chute, walls between said spaced plates defining a plurality of intermediate chutes, said chutes being substantially vertical and having their upper termini arranged in successively sloping relationship, at least one of said plates having edges therein defining lateral apertures providing access to the interiors of said first and last chutes, at least three pivoting fingers positioned to extend into the apertures in the first chute and to be intercepted by a coin falling through said chute, at least three pivoting fingers positioned to extend into the apertures of said last chute and to be intercepted by a coin passing through said chute, a plurality of switches operatively associated with said fingers, said switches being actuated by movement of said fingers, a gate at the entrance of each chute, a spring operatively associated with each of said fingers to re-position the fingers after displacement by a coin, connecting means between at least one of said gates and a switch finger for opening the gate by means of the finger spring, means for interlocking said switch fingers, a coin receptacle positioned at the bottom of said spaced plates for receiving coins falling through said chutes, means including an electric circuit responsive to the switches for dispensing coins selectively from said receptacle, a coin retainer positioned in said first and last chutes, means for displacing said coin retainer, and time delay means for locking the retainer in a displaced position for a predetermined time interval.

8. In coin handling apparatus, a coin chute assembly comprising spaced front and rear plates, walls between said spaced plates defining a first chute, walls between said spaced plates defining a last chute, walls between said spaced plates defining a plurality of intermediate chutes, said chutes being substantially vertical and having their upper termini arranged in successively sloping relationship, at least one of said plates having edges therein defining lateral apertures providing access to the interiors of said first and last chutes, at least three pivoting fingers positioned to extend into the apertures in the first chute and to be intercepted by a coin falling through said chute, at least three pivoting fingers positioned to extend into the apertures of said last chute and to be intercepted by a coin passing through said chute, a plurality of switches operatively associated with said fingers, said switches being actuated by movement of said fingers, a gate at the entrance of each chute, a spring operatively associated with each of said fingers to re-position the fingers after displacement by a coin, connecting means between at least one of said gates and a switch finger for opening the gate by means of the finger spring, means for interlocking said switch fingers, a coin receptacle positioned at the bottom of said spaced plates for receiving coins falling through said chutes, means including an electric circuit responsive to the switches for dispensing coins selectively from said receptacle, a coin retainer positioned in said first and last chutes, a solenoid for displacing said coin retainer, time delay means for locking the retainer in a displaced position for a predetermined time interval, a switch finger positioned in the first and last apertures below the retainer, a switch operatively associated with each of said last-named fingers, and electrical connections between said last-named switches and the solenoid whereby the solenoid remains energized until the coin falling through either the first or last chute has cleared the lowest finger.

9. In coin handling apparatus, a coin chute assembly comprising spaced front and rear plates, walls between said spaced plates defining a plurality of chutes through which a coin may freely fall by gravity, said plates having edges therein defining lateral apertures providing access to the interior of at least two of said chutes, at least one double-throw switch mounted adjacent each of said apertures, finger means extending into the apertures for actuating said switches, a coin receptacle at the bottom of said chutes adapted to receive coins falling through said chutes, a solenoid operatively associated with said coin receptacle, and electrical connections between said switches and said solenoid.

10. In a coin handling apparatus, a penny coin chute assembly comprising a first pair of spaced plates, walls between said first pair of plates defining a plurality of chutes through which pennies can freely fall by gravity, said first pair of plates having edges therein defining lateral apertures providing access to the interior of at least two of said chutes, a nickel coin chute assembly comprising a second pair of spaced plates, walls between said second pair of plates defining a plurality of chutes through which nickels can freely fall by gravity, said second pair of plates having edges therein defining lateral apertures providing access to the interior of at least two of said nickel chutes, a dime coin chute assembly comprising a third set of spaced plates, walls between said third set of plates defining a plurality of chutes through which dimes may freely fall by gravity, said third pair of plates having edges therein defining lateral apertures providing access to the interior of at least two of said dime chutes, a plurality of switches mounted adjacent each of said apertures on each of said plates, finger means extending into the apertures for actuating said switches, means for interlocking said switches to hold them in a latched position, a penny receptacle at the bottom of the penny coin chute assembly, a nickel receptacle at the bottom of the nickel coin chute assembly, a dime receptacle at the bottom of the dime coin chute assembly, a solenoid operatively associated with each of said coin receptacles for selectively dispensing coins therefrom, a plurality of circuits between the switches and the solenoids, a double-throw switch connected in said circuits to condition a first circuit when the switch is unactuated, and to condition a second circuit when the switch has been latched by a coin falling through the chute associated with said switch.

11. In coin handling apparatus, a first coin chute assembly comprising a first pair of spaced plates, walls between said plates defining a plurality of chutes through which coins can freely fall by gravity, said plates having edges therein defining lateral apertures providing access to the interior of at least two of said chutes, a second coin chute assembly comprising a second pair of spaced plates, walls between said second pair of plates defining a plurality of chutes through which coins can freely fall by gravity, said second pair of plates having edges therein, defining lateral apertures providing access to the interior of at least two of said chutes of said second chute assembly, a plurality of switches mounted adjacent each of said apertures of said first and second coin chute assemblies, finger means extending into the apertures for actuating said switches, interlocking members of said switches to hold the switches in a latched position after actuation thereof, a coin receptacle at the bottom of said first coin chute assembly, a solenoid operatively associated with said coin receptacle for dispensing coins therefrom, a plurality of circuits between said switches and said solenoid, a double throw switch connected in said circuits to condition a first circuit when the switch is not actuated, and to condition a second circuit when the switch has been actuated by a coin falling through the chute associated with said switch.

12. In coin handling apparatus, the combination comprising means to receive a first coin, at least two members associated with said means for actuation by said coin, each such member being interconnected with a control member to condition its interconnected control member for performance of a selected operation upon receipt by the apparatus of a further coin as recited hereinafter, a second means adapted to receive a further coin, a member associated with said second means for actuation by a further coin and interconnected with a further control member to cause said further control member, conjointly with one of first-mentioned conditioned control members, to supply energy to an actuating member to perform a coin-controlled operation, a third means adapted to receive a coin of different denomination from said second means, a member associated with said third means for actuation by a coin of said different denomination, and interconnected with a still further control member to cause said still further control member, conjointly with another of said first-mentioned conditioned control members, to supply energy to said actuating member and also to a different actuating member from said aforementioned actuating member, and perform a different control operation in addition to said first control operation, in case a coin is received by said third means rather than said second means.

13. In coin handling apparatus, the combination comprising a coin receiving chute, a plurality of separately pivoted control arms each having a portion successively intercepting the path of a coin through said chute for pivotal actuation thereby, and means operable by said pivotal actuation for interconnecting said control arms in interlocked relation positioned to condition said apparatus for operation, upon passage of a coin into successive contact with said intercepting portions thereof.

14. In coin handling apparatus, the combination comprising a chute to receive a first coin, at least two control members having portions intercepting the path of a coin through said chute and interconnected respectively with switches in separate circuits to close said switches upon receipt of a coin, separate chutes to receive further coins of different denominations, means in one of said separate chutes to close an open switch in one of said separate circuits and means in another of said separate chutes to close an open switch in another of said separate circuits, whereby to complete closure of the circuit associated with the first of said separate chutes to receive a coin, an actuating means associated with each of said circuits for actuation thereby, and a second actuating means of different character also associated with at least one of said circuits, whereby a selected combination of actuations is performed in accordance with selection determined by the denomination of the coin received in one of said separate chutes.

15. In coin handling apparatus, the combination comprising, a coin receiving chute, a plurality of control arms having portions intercepting a coin passing through said chute for sequential actuation thereby, a plurality of switches in separate circuits each operatively connected with a different one of said control arms, means interconnecting said control arms mechanically to maintain each of said switches closed upon receipt of a coin in said chute, a plurality of further chutes each adapted to receive a coin of different denomination from each other, and a control arm in each of said further chutes having a portion intercepting a coin passing through the chute, each such last-mentioned control arm being interconnected with an open switch in circuit with one of said plurality of first-mentioned switches upon receipt of a coin by one of said further chutes, and actuating means associated with each such circuit, whereby to perform an actuating operation selected by said combination of coins upon closure of said combination of switches.

16. In coin handling apparatus, the combination comprising a chute to receive a coin, at least two switch-controlling arms in said chute adapted to close switches in different circuits and adapted to be actuated to switch-closing position and retained in switch-closing position by the passage of a coin into said chute, a gate at the mouth of said chute, means in the path of a coin passing through said chute adapted to be actuated by said coin to move said gate in to chute closing position, whereby in case of feed of subsequent coins of similar denomination into said apparatus, said coins will be directed into different chutes, a separate chute for receiving a further coin of different denomination, means in said last-mentioned chute to close a switch in circuit with one of the switches closed by one of the arms in said first-mentioned chute and thereby perform an actuating operation, and means in a chute designed to receive a subsequent coin of the same denomination introduced in the first-mentioned chute to actuate a switch in circuit with another of said switches actuated into closed position by the first-mentioned coin, whereby to perform an actuating operation different from the first-mentioned actuating operation, depending upon the denomination of the coin received last.

References Cited in the file of this patent

UNITED STATES PATENTS

| 704,268 | O'Connell | July 8, 1902 |
| 948,838 | Asbury | Feb. 8, 1910 |
| 1,582,659 | Baker | Apr. 27, 1926 |
| 2,016,127 | Weiler | Oct. 1, 1935 |
| 2,100,061 | Sundelin | Nov. 23, 1937 |
| 2,122,550 | Adrian | July 5, 1938 |
| 2,226,908 | Page | Dec. 31, 1940 |
| 2,246,590 | Hoyt | June 24, 1941 |
| 2,271,397 | McDermott | Jan. 27, 1942 |
| 2,323,255 | Sutherland | June 29, 1943 |
| 2,354,896 | Weiler | Aug. 1, 1944 |
| 2,371,260 | Petersen | Mar. 13, 1945 |

FOREIGN PATENTS

| 498,426 | Great Britain | Jan. 9, 1939 |
| 560,028 | Great Britain | Mar. 16, 1944 |
| 334,770 | Germany | Mar. 19, 1921 |
| 618,237 | Germany | Sept. 5, 1935 |